US009729999B2

(12) United States Patent
Wang et al.

(10) Patent No.: US 9,729,999 B2
(45) Date of Patent: Aug. 8, 2017

(54) CROSS-LAYER CONTEXT MANAGEMENT

(71) Applicant: CONVIDA WIRELESS, LLC, Wilmington, DE (US)

(72) Inventors: Chonggang Wang, Princeton, NJ (US); Qing Li, Princeton Junction, NJ (US); Paul L. Russell, Jr., Pennington, NJ (US); Hongkun Li, Malvern, PA (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 148 days.

(21) Appl. No.: 14/644,731

(22) Filed: Mar. 11, 2015

(65) Prior Publication Data

US 2015/0263880 A1    Sep. 17, 2015

Related U.S. Application Data

(60) Provisional application No. 61/951,041, filed on Mar. 11, 2014.

(51) Int. Cl.
*H04L 29/08* (2006.01)
*H04W 4/00* (2009.01)
(Continued)

(52) U.S. Cl.
CPC ........... *H04W 4/005* (2013.01); *H04L 67/327* (2013.01); *H04L 69/321* (2013.01);
(Continued)

(58) Field of Classification Search
CPC ..... H04W 4/005; H04W 80/00; H04W 80/02; H04W 80/08–80/12; H04W 67/044;
(Continued)

(56) References Cited

U.S. PATENT DOCUMENTS 8,958,419 B2 * 2/2015 Cummings ........... H04L 49/109
370/360
2004/0233855 A1 * 11/2004 Gutierrez ................ H04L 45/00
370/252

(Continued)

OTHER PUBLICATIONS

IEEE 802.15 TG8 "PAC Framework Document", IEEE-SA Mentor, 802.15.8, No. 5, Jan. 2014.

(Continued)

*Primary Examiner* — Edan Orgad
*Assistant Examiner* — Ivan O Latorre
(74) *Attorney, Agent, or Firm* — Baker & Hostetler LLP

(57) ABSTRACT

In peer-to-peer (P2P) communications, it has been recognized herein that various context information needs to be exchanged between peer devices (PDs) or between different layers/protocols within a peer device (PD). Various embodiments described herein address how to design effective management functions, services, and primitives for context management across and/or within different protocol layers to enable context-aware peer-to-peer communications in proximity. This disclosure proposes multiple embodiments for cross-layer context management in context-aware peer-to-peer communication in proximity. For example, embodiments described herein provide context management to efficiently enable context-aware P2P communications, such as, for example, social networks.

19 Claims, 29 Drawing Sheets

(51) Int. Cl.
*H04W 80/00* (2009.01)
*H04W 80/02* (2009.01)

(52) U.S. Cl.
CPC ....... *H04L 29/08972* (2013.01); *H04W 80/00* (2013.01); *H04W 80/02* (2013.01)

(58) Field of Classification Search
CPC ............ H04W 67/1044; H04L 69/321; H04L 69/322–69/329; H04L 29/08306; H04L 29/08396; H04L 67/104; H04L 29/08–29/08072; H04L 29/08972
See application file for complete search history.

(56) References Cited

U.S. PATENT DOCUMENTS

| | | | |
|---|---|---|---|
| 2005/0037767 A1* | 2/2005 | Kim | H04L 29/06 455/450 |
| 2006/0126847 A1* | 6/2006 | Ho | H04L 63/065 380/277 |
| 2006/0140150 A1* | 6/2006 | Olvera-Hernandez | H04W 36/005 370/331 |
| 2009/0046657 A1* | 2/2009 | Kim | H04W 36/005 370/331 |
| 2009/0046659 A1* | 2/2009 | Sebire | H04W 36/02 370/331 |
| 2009/0124208 A1* | 5/2009 | Mody | H04L 63/162 455/67.11 |
| 2010/0165961 A1* | 7/2010 | Rosario | H04W 8/005 370/338 |
| 2010/0284337 A1* | 11/2010 | Luft | H04W 84/18 370/328 |
| 2012/0002718 A1* | 1/2012 | Jun | H04L 65/60 375/240.02 |
| 2013/0094597 A1* | 4/2013 | Vijayasankar | H04B 3/542 375/257 |
| 2013/0165170 A1* | 6/2013 | Kang | H04W 16/14 455/509 |
| 2013/0317892 A1* | 11/2013 | Heerboth | H04W 88/08 705/14.4 |
| 2014/0010550 A1* | 1/2014 | Bahr | H04B 10/116 398/127 |
| 2014/0269658 A1* | 9/2014 | Sadasivam | H04W 72/0406 370/338 |
| 2015/0019718 A1* | 1/2015 | Jeong | H04W 48/16 709/224 |
| 2015/0023342 A1* | 1/2015 | Joo | H04W 56/0035 370/350 |
| 2015/0305023 A1* | 10/2015 | Jeong | H04W 48/12 370/336 |
| 2016/0007275 A1* | 1/2016 | Park | H04W 48/14 455/434 |

OTHER PUBLICATIONS

IEEE P802.15, "Some Details for Draft Application Matrix for", Dec. 2012, 2 pages.
IEEE Standard for Local and Metropolitan Area Networks—Part 15.4: Low-Rate Wireless Personal Area Networks (LR-WPANs), IEEE Std 802.15.4-2011, Sep. 5, 2011, 314 pages.
International Application No. PCT/US2015/019925: International Search Report and Written Opinion dated Jul. 10, 2015.
Kwak, "TG8 PAC Framework document (clean version)", IEEE P802.15 Working Group for Wireless Personal Area Networks (WPANs), Jan. 24, 2014, 16 pages.
Li et al, Final Proposals for IEEE 802.15.8, IEEE P802.15 Working Group for Wireless Personal Area Networks (WPANs), Jul. 8, 2013, 100 pages.
Wang, "Cross-Layer Context Management Proposal Document", IEEE P802.15 Working Group for Wireless Personal Area Networks (WPANs), May 5, 2014, 1-17 pages.

* cited by examiner

CROSS-LAYER CONTEXT MANAGEMENT

CROSS REFERENCE TO RELATED APPLICATIONS

This application claims the benefit of U.S. Provisional Patent Application Ser. No. 61/951,041 filed Mar. 11, 2014 the disclosure of which is hereby incorporated by reference as if set forth in its entirety herein.

BACKGROUND

Referring to FIG. 1, an example architecture 100 is shown. The architecture 100 conforms to an IEEE 802.15.4-2012 reference model or an LR-WPAN device architecture. The architecture 100 includes a physical (PHY) layer 102, a medium access control (MAC) layer 104, and upper layers 106. Upper layers may also be referred to herein as higher or high layers 106. Aspects of the architecture 100 are further described in IEEE Std 802.15.4-2012, "Part 15.4: Wireless Medium Access Control (MAC) and Physical Layer (PHY) Specifications for Low-Rate Wireless Personal Area Networks (WPANs)," which is incorporated by reference as if set forth in its entirety herein, and which is referred to herein as IEEE 802.15.4-2012. As shown, the architecture 100 includes four Service Access Points (SAPs) that have been defined for interactions between two layers. Specifically, the illustrated architecture 100 includes 1) a MAC Common Part Sublayer (MCPS) SAP 108 for data plane interactions between upper layers 106 and the MAC layer 104; 2) a MAC SubLayer Management Entity (MLME) SAP 110 for management plane interactions between upper layers 106 and the MAC layer 104; 3) a PD SAP 112 for data plane interactions between the MAC layer 104 and the PHY layer 102; and 4) a Physical Layer Management Entity (PLME) SAP 114 for management plane interactions between the MAC layer 104 and the PHY layer 102.

In IEEE 802.15.4-2012, service primitives are defined to realize a service, for example, by interacting between two protocol layers. Referring to FIG. 2, a primitive model 200 is shown as defined by IEEE. The primitive model 200 includes a first device 201a and a second device 201b. The first device 201a in the primitive model 200 makes a request, and thus the first device 201a can also be referred to as a Requestor 201a. The second device 201b in the primitive model 200 receives the request, and thus the second device 201b can also be referred to as a Recipient 201b. In accordance with the illustrated primitive model 200, one "Request" primitive 202 can result in: one "Confirm" primitive 204 at the same device (e.g., Requester 201a); and an "Indication" primitive 206 and a "Response" primitive 208 at the other device (e.g., Recipient 201b). The model 200 is referred to herein as a one-to-one primitive model. Still referring to FIG. 2, in accordance with the illustrated example, the request primitive 202 is used to request that a service is initiated. The indication primitive 206 is used to indicate an external event to the user of the second device 201b. The response primitive 208 is used to complete a procedure previously invoked by the indication primitive 206. The confirm primitive 204 is used to convey the results of one or more associated previous service requests.

IEEE 802.15.4-2012, which is incorporated by reference as if the disclosure of which is set forth in its entirety herein, defines the following types of services, and each type is realized via certain primitives: 1) MAC management service, which is realized via MLME SAP primitives; 2) MAC data service, which is realized via MCPS SAP primitives; 3) PHY management service, which is realized via PLME SAP primitives; and 4) PHY data service, which is realized via PD SAP primitives.

Table 1 below shows example MLME-SAP primitives that are specified in IEEE 802.15.4-2012, and Table 2 below shows example MCPS-SAP primitives that are specified in IEEE 802.15.4-2012.

TABLE 1

| Primitive Name | Description | Request | Indication | Response | Confirm |
|---|---|---|---|---|---|
| MLME-ASSOCIATE | Used for a device to associate with a WPAN | ✓ | ✓ | ✓ | ✓ |
| MLME-DISASSOCIATE | Used for a device to de-associate with a WPAN | ✓ | ✓ | | ✓ |
| MLME-BEACON-NOTIFY | To notify upper layer of a received beacon | | ✓ | | |
| MLME-COMM-STATUS | To allow the MLME to indicate a communications status | | ✓ | | |
| MLME-GET | To request information about a given PIB attribute | ✓ | | | ✓ |
| MLME-GTS | To request and maintain GTSs | ✓ | ✓ | | ✓ |
| MLME-ORPHAN | Used by a coordinator to issue a notification of an orphaned device | | ✓ | ✓ | |
| MLME-RESET | To reset MAC sublayer | ✓ | | | ✓ |
| MLME-RX-ENABLE | To enable or disable a device's receiver at a given time | ✓ | | | ✓ |
| MLME-SCAN | To either find PANs in a channel or measure the energy in the channel | ✓ | | | ✓ |
| MLME-SET | To write PIB attributes | ✓ | | | ✓ |
| MLME-START | Used by an FFD to initiate a PAN, to begin using a new superframe configuration, or to stop transmitting beacons. In addition, a device uses these | ✓ | | | ✓ |

TABLE 1-continued

| Primitive Name | Description | Request | Indication | Response | Confirm |
|---|---|---|---|---|---|
| | primitives to begin using a new superframe configuration | | | | |
| MLME-SYNC | To synchronize with a coordinator and to communicate loss of synchronization to the next higher layer | ✓ | | | ✓ |
| MLME-SYNC-LOSS | To indicate the loss of synchronization with the coordinator to the next higher layer | | ✓ | | |
| MLME-POLL | To request data from the coordinator | ✓ | | | ✓ |
| MLME-DPS | Used by a device to enable or disable dynamic preamble selection (DPS) as well as to define the value of dynamic preamble for transmission and reception for a given time (only for UWB PHY) | ✓ | ✓ | | ✓ |
| MLME-SOUNDING | To obtain the results of a channel sounding from an Ranging-capable Device (RDEV) that supports the optional sounding capability | ✓ | | | ✓ |
| MLME-CALIBRATE | To obtain the results of a ranging calibration request from an RDEV | ✓ | | | ✓ |

TABLE 2

| Primitive Name | Description | Request | Indication | Response | Confirm |
|---|---|---|---|---|---|
| MCPS-DATA | Used for a device to associate with a WPAN | ✓ | ✓ | | ✓ |
| MCPS-PURGE | Used for a device to de-associate with a WPAN | ✓ | | | ✓ |

FIG. 3 shows an example reference model 300 proposed for IEEE 802.15.8. Referring to the example that is illustrated in FIG. 3, a PD Management Entity (PDME) 302 is defined, but it is recognized herein that current approaches, including the current PDME, have not addressed how to exchange various specific management information (e.g., context information). Further, it is recognized herein that there are no MAC/PHY primitives defined in the current approaches.

SUMMARY

In peer-to-peer (P2P) communications, it has been recognized herein that various context information should be exchanged between peer devices (PDs) and/or between different layers/protocols within a peer device (PD). Various embodiments described herein address how to design effective management functions, services, and primitives for context management across and/or within different protocol layers to enable context-aware peer-to-peer communications in proximity. This disclosure proposes multiple embodiments for cross-layer context management in context-aware peer-to-peer communication in proximity. For example, embodiments described herein provide context management to efficiently enable context-aware P2P communications, such as, for example, social networks.

In one embodiment, at a peer device, context information is exchanged across layers in the peer device. The context information may be exchanged via at least one service access point (SAP). For example, the at least one SAP may include a physical layer context management (PLCM) SAP, a medium access control (MAC) layer context management (MLCM) SAP, and a high layer context management (HLCM) SAP. Further, in accordance with various example embodiments, new context management primitives and procedures are described herein for the PLCM SAP to support measuring context information at the PHY layer and reporting context information to the MAC layer. Further, new context management primitives and procedures are described herein for the MLCM SAP to provide context management services (e.g., context retrieve, context subscription and notification, etc.) between the MAC layer and a context manager. Further yet, new context management primitives and procedures for the HLCM SAP to provide context management services (e.g. context retrieve, context subscription and notification, etc.) between a high layer and the context manager This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
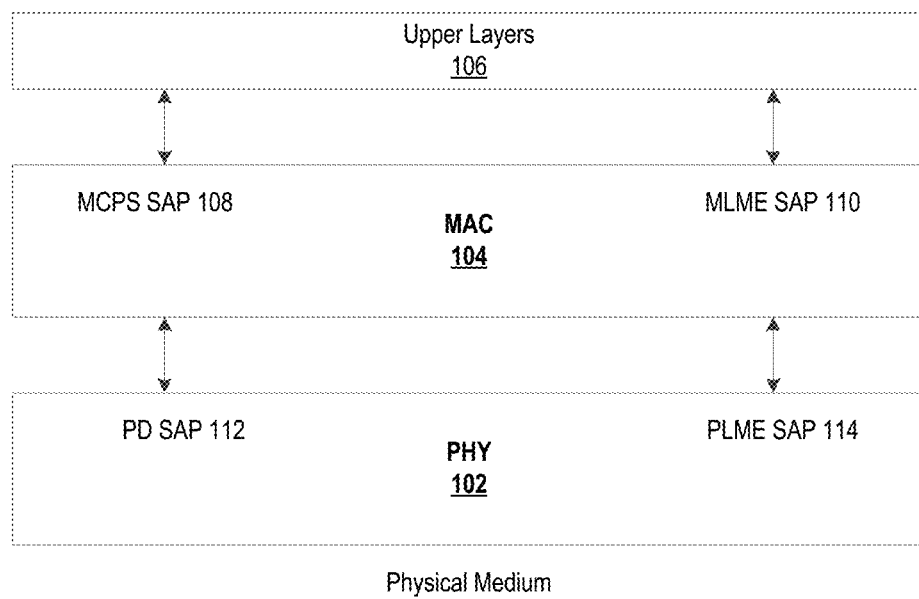
FIG. 1 illustrates an example IEEE 802.15.4-2012 reference model or LR-WPAN device architecture.

For convenience, some acronyms that are used in this disclosure are described below:
CM Context Manager
ETSI European Telecommunications Standards Institute
HLCM High Layer Context Management
IEEE Institute of Electrical and Electronics Engineers
IoT Internet of Things
M2M Machine-to-Machine
MAC Medium Access Control
MCPS MAC Common Part Sublayer
MLCM MAC Layer Context Management
MLME MAC subLayer Management Entity
P2P Peer-to-Peer
PD Peer Device
PDME PD Management Entity
PHY Physical
PLCM PHY Layer Context Management
PLME PHY Layer Management Entity
PRL Protocol Layer
SAP Service Access Point As used herein, the term protocol layer may refer to the PHY layer 102, the MAC layer 104, and/or upper layers 106 (e.g., layers above the MAC layer 104). It will be understood that, for convenience and clarity, reference numbers are repeated in different figures to indicate the same or similar features. A protocol layer typically provides certain services, which can be accessed by other protocol layers. The term Service Access Point (SAP), unless otherwise specified, refers to an interface between two neighboring (adjacent) protocol layers. For example, via a SAP, a protocol layer can access services provided by another protocol layer. The term primitive, unless otherwise specified, refers to the message transmitted between two neighboring protocol layers through their SAP.

Example Context-aware primitives in a context-aware P2P architecture are specified below in Table 3 and Table 4. The example primitives have various context information (e.g., application identifiers) embedded in them, but specific primitives for supporting context management and operations across protocols layers are not defined in Tables 3 and 4.

TABLE 3

MAC MLME Primitives for Management

| MLME Primitives | Type | Description |
| --- | --- | --- |
| MLME-CONTEXT-APPi | Request, Confirm | CONTEXT exchange for Application i<br>This enables the context exchange with higher layer for a specific application. |
| MLME-GENSCAN | Request, Confirm | GENeral SCAN initiated by higher layer<br>This enables the higher layer to trigger a general purpose scan with related context information. For example, a general scan can be used to detect the useful peer information in proximity needed by multiple logic functions such as peer discovery, context-aware synchronization, channel allocation detection, context-aware power detection etc., especially at the beginning of establishing an infrastructure-less P2P network. |
| MLME-START-APPi | Request, Confirm | START Application i<br>This enables the higher layer to initiate a P2P network for a specific application. |
| MLME-SYNC-APPi | Request | SYNChronization for Application i<br>This enables the higher layer to direct the Synchronization Function to synchronize with a specific application, especially required for supporting multiple applications simultaneously. |
| MLME-SYNC-LOSS-APPi | Indication | SYNChronization LOSS for Application i<br>This enables the Synchronization Function to notice the higher layer the loss of synchronization for a specific application. |
| MLME-DISCOVERY-APPi | Request, Confirm, Indication, Response | DISCOVERY for Application i<br>This enables the higher layer to assist peer discovery for a specific application. For example, some confirmation may be needed from the user for security and/or privacy concerns. |
| MLME-CHANNEL-APPi | Request, Confirm | CHANNEL management for Application i<br>This enables the higher layer to trigger channel re-allocation due to channel conditions or QoS of the service for a specific application. |
| MLME-ASSOCIATE-APPi | Request, Confirm, Indication, Response | ASSOCIATE for Application i<br>This enables the higher layer to assist peer association for a specific application. For example, some confirmation may be needed from the user for security and/or privacy concerns. |
| MLME-ASSOCIATEUPDATE-APPi | Request, Confirm, Indication, Response | ASSOCIATE UPDATE for Application i<br>This enables the higher layer to trigger association update for a specific application. For example, update the associate due to context change, or QoS, etc. |
| MLME-DISASSOCIATE-APPi | Request, Confirm, Indication, Response | DISASSOCIATE for Application i<br>This enables the higher layer to trigger disassociation for a specific application. For example, disassociation due to channel status, QoS, or service policy, etc. |
| MLME-REASSOCIATE-APPi | Request, Indication, Response, Confirm | RE-ASSOCIATE for Application i<br>This enables the higher layer to trigger re-association for a specific application. For example, re-associate due to channel condition, QoS, or policy, etc. |
| MLME-TX-APPi | Request, Confirm | Enable TX (transmitting) for Application i<br>This allows the higher layer to enable the transmitting for a specific application. |
| MLME-RX-APPi | Request, Confirm | Enable RX (receiving) for Application i<br>This allows the higher layer to enable the receiving for a specific application. |
| MLME-POWERCONTROL-APPi | Request, Confirm | POWER CONTROL for Application i<br>This enables the higher layer to trigger the context-aware power control for a specific application. |
| MLME-MEASURE-APPi | Request, Confirm | MEASUREment for Application i<br>This enables the higher layer to trigger the measurement for a specific application, which may be used for cross-layer QoS management. |
| MLME-REPORT-APPi | Request, Confirm | REPORT from logic functions for Application i<br>This enables the higher layer to trigger the report function for a specific application, which may be used for cross-layer QoS management. |
| MLME-SLEEP-APPi | Request, Confirm, Indication, Response | SLEEP mode for Application i<br>This enables the higher layer to force lower layers into sleep mode. |
| MLME-WAKEUP-APPi | Request, Confirm | WAKE UP from sleep mode for Application i<br>This enables the higher layer to pull lower layers out of sleep mode. |

TABLE 4

MAC MCPS Primitives for Data

| MCPS Primitives | Type | Description |
|---|---|---|
| MCPS-DATA-APPi | Request, Indication, Confirm | DATA transmission for Application i This enables the higher layer to trigger the Data Transceiving Function to transmit data for a specific application, which is needed for supporting multi-application data transmitting and receiving. |

In P2P communications, it has been recognized herein that various context information needs to be exchanged between PDs or between different protocols within a given PD. FIGS. 4-22 (described hereinafter) illustrate various embodiments of methods and apparatus for exchanging various context management information. In these figures, various steps or operations are shown being performed by one or more peer devices. It is understood that the peer devices illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 23C or 23D described below. That is, the methods illustrated in FIGS. 4-22 may be implemented in the form of software (e.g., computer-executable instructions) stored in a memory of a network node, such as for example the node or computer system illustrated in FIG. 23C or 23D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 23C and 23D, respectively) of the node under control of the processor of the node and the computer-executable instructions (e.g., software) that it executes.

Figure 4:
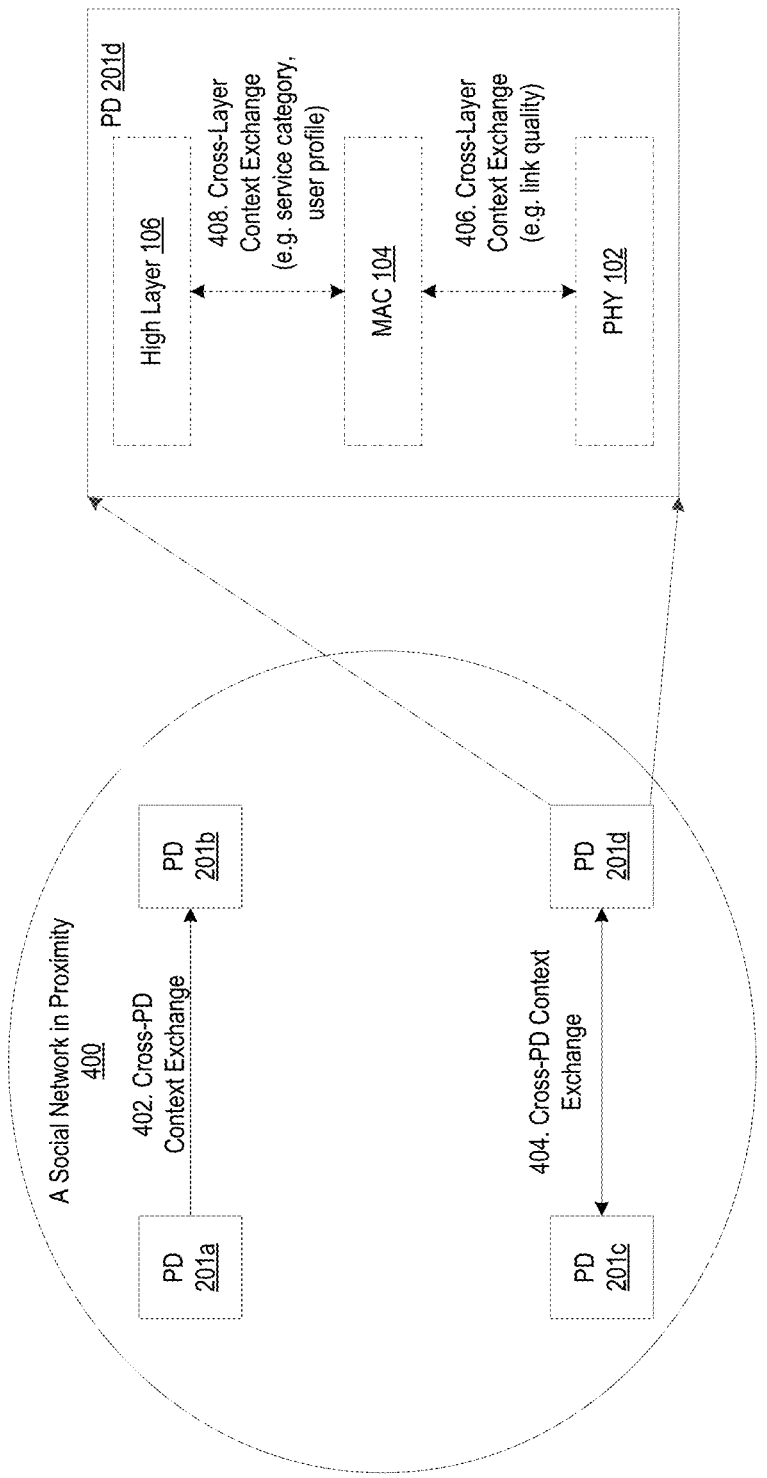
FIG. 4 is a system diagram that shows an example of social networks in proximity in accordance with an example embodiment.

Referring now to FIG. 4, an example network 400 includes a plurality of peer devices (PDs) 201 that can communicate with each other via proximity communications. It will be appreciated that the example network 400 is simplified to facilitate description of the disclosed subject matter and is not intended to limit the scope of this disclosure. Other devices, systems, and configurations may be used to implement the embodiments disclosed herein in addition to, or instead of, a network such as the network 400, and all such embodiments are contemplated as within the scope of the present disclosure. It will further be appreciated that reference numbers may be repeated in various figures to indicate the same or similar features in the figures.

Still referring to FIG. 4, during communication, a first PD, for instance the PD 201a, may need to indicate certain context information to a second PD, for instance a PD 201b. For example, the context information that it is indicated at 402 may include, without limitation, a link quality associated with the PD 201a and the PD 201b, a physical location associated with the PD 201a, a residual battery level associated with the PD 201a, a user profile associated with the PD 201a, or the like. Generally, the term context information may refer to information that can be used to describe, track, and/or infer the situational state or condition of a service, an application, a device, a network, or a combination thereof. An exchange, such as the exchange at 402 for example, can be referred to as a cross-PD context exchange. By way of example, at 404, in accordance with illustrated example, a third PD 201c and a fourth PD 201d exchange information with each other. In an example embodiment, as described further herein, context can also be exchanged across different protocol layers within a PD. For example, as depicted in FIG. 4, within the PD 201d, the MAC layer 104 may obtain a link quality from the PHY layer 102 (at 406), and the high layer 106 may pass service category information to the MAC layer 104 (at 408). An exchange, such as the example exchange at 406 and the example exchange at 408, can be referred to as cross-layer context exchange. In an example aspect, a cross-PD context exchange can be triggered by a cross-layer context change. For example, by receiving service category information from the high layer 106 (at 408), the MAC layer 104 of the PD 201d may initiate a cross-PD context exchange to notify the PD 201c (at 404) of the service category information associated with the PD 201d. It is recognized herein that such context management is currently lacking, such context management may be critical to support application-driven P2P communications, for instance P2P communications in which a peer device participates in multiple applications simultaneously as required by IEEE 802.15.8, referenced above.

Various embodiments described herein address various issues, for example, such as how to design effective management functions, services, and primitives for context management across and/or within different protocol layers to enable context-aware peer-to-peer communications in proximity. Multiple embodiments are described herein for cross-layer context management in context-aware peer-to-peer communications in proximity. For example, embodiments described herein provide context management to efficiently enable context-aware P2P communications, such as, for example, social networks such as the example network 400 illustrated in FIG. 4.

Presented below are detailed descriptions of various embodiments. First, example use cases that apply to context management for P2P communications are introduced. Following the introduction of example uses cases, embodiments are described that include various new functions and primitives for cross-layer context management.

Use Cases

In an example use case, P2P applications may be the only way to maintain communications among peers when network infrastructure becomes congested or unavailable, for example due to disasters. In another example use case, P2P communications may improve network performance (e.g., system capacity) by triggering and facilitating traffic offloading. P2P Communications cover a large variety of applications that can be categorized in four general types: 1) human-to-human; 2) human-to-machine; 3) machine-to-machine (M2M); and 4) machine-to-human.

As used herein and as mentioned above, unless otherwise specified, context information (or simply context) generally refers to information that describes a situation or surroundings associated with a node or entity. Context information in P2P communications can be classified into the following example classes: 1) device context that describes a device profile, capability, and/or status (e.g., location, battery level, mobility, etc.); 2) network context that shows network conditions and measurements (e.g., link quality, congestion, bandwidth, etc.); 3) user context that indicates properties about a user or a group of users (e.g., gender, age, address, body conditions, shopping behavior, relationship, etc.); and 4) service context that is related to characteristics of services (e.g., service category, service rate, or the like). As described herein, different protocol layers may have or may generate different context information. For instance, the PHY layer 102 and the MAC layer 104 may generate device and network context, and the higher layers 106 may have service context and/or user context. As used herein, the term context-awareness generally refers incorporating context information into a system design to improve overall system performance. In other words, it is recognized herein that P2P communication protocols should be aware of and should be adapted to device/user/service/network context information. It is further recognized herein that awareness of context information and adaptation to context information benefits from the design of effective context management functions and corresponding primitives across different protocol layers.

For example, the following context information may exist in a P2P social networking application, presented by way of example and without limitation: device context (e.g., battery condition, location); user context (e.g., user ID, user icon, user photo, user location, degree of connections, joined group members, etc.); network context (e.g., activated connections, quality associated with activated connections); service context (e.g., service category to indicate social networking); application context (e.g., an application identifier such as Facebook or Twitter, a message type such as a Facebook status update, a friendship invitation, etc.)

Various context management functions (or services) are described herein. Such functions may benefit social network applications, among others. Examples of intra-peer context management functions, which refer to functions that are implemented within a peer, include, without limitation: a functionality in which the higher layer 106 requests that the MAC layer 104 discover other peers in proximity for a networking application; a functionality in which higher layers 106 request that the MAC layer 104 discover a given peer (e.g., friends) in proximity, so that the given peer can use a networking application; and a functionality in which the MAC layer 104 indicates to higher layers 106 that new peer that are using a particular application are in proximity. Examples of inter-peer context management functions include, without limitation, a functionality in which a peer indicates its service/application/user context to a group of other peers within proximity; and various group based activities (e.g., group information notification, assignment/ update of a group within a networking application, etc.)

Example Embodiments

Example embodiments described herein implement various cross-layer context management features, such as, for example and without limitation: 1) context management functions; 2) context management primitives; 3) integrated context management procedures; and 4) a new service primitive model.

Figure 5:
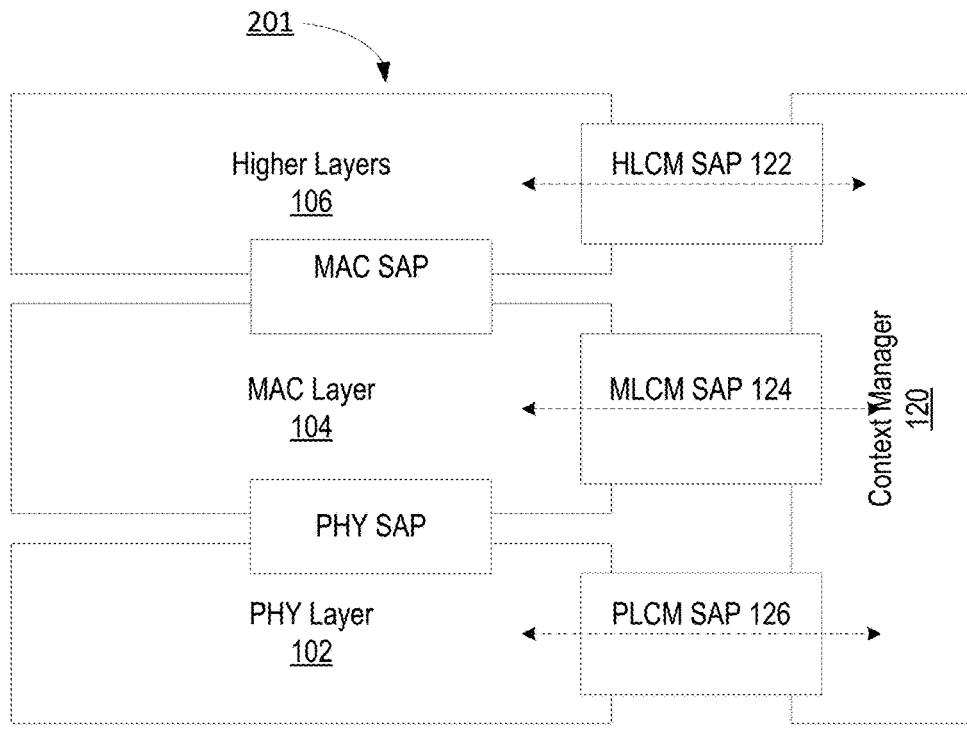
FIG. 5 is a block diagram that shows a cross-layer context manager in accordance with an example embodiment.

Referring now to FIG. 5, in accordance with the illustrated embodiment, a peer device 201 includes a context manager 120 that is defined as a function across multiple protocol layers. The context manager 120 interfaces to the layers via three horizontal SAPs. As shown, the context manager 120 interacts with the high layers 106 via a higher layer context manager (HLCM) service access point 122. As further shown, the context manger 120 interacts with the MAC layer 104 via a MAC layer context manager (MLCM) SAP 124, and the context manager 120 interacts with PHY layer 102 via a PHY layer context manager (PLCM) SAP 126.

Figure 6:
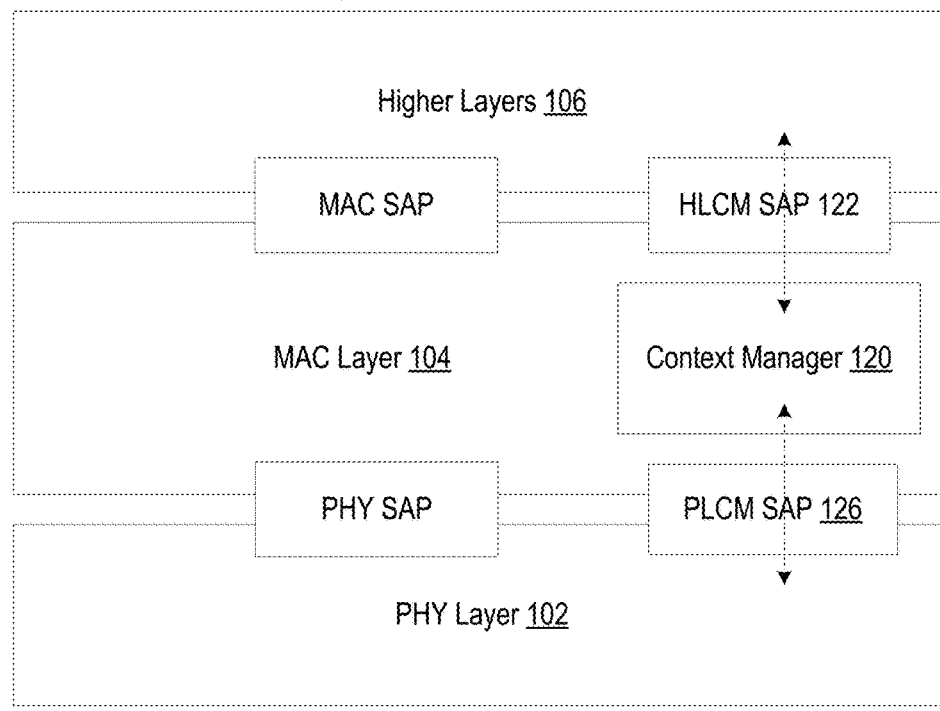
FIG. 6 is a block diagram that shows another cross-layer context manager in accordance with another example embodiment.

Referring to FIG. 6, in accordance with another embodiment, a peer device 102 includes the context manager 120 that is implemented as a part of the MAC layer 104. Thus, the context manager (CM) 120 interacts with the PHY layer 102 via the PLCM SAP 126, and the CM 120 in FIG. 6 interacts with the higher layers 106 via the HLCM SAP 122. In accordance with the example, interactions between the context manager 120 and other functions of the MAC layer 104 are within the MAC layer, and thus do not require primitives. As used herein, unless otherwise specified, it will be understood that the higher layers 106 may include an application layer. Thus, in accordance with the illustrated embodiments of FIG. 5 and FIG. 6, an application can interface to the context manager 120 to retrieve context and manipulate context information stored at the context manager 120.

Table 5 below lists example functions and interactions between the context manager 120 and other protocol layers (e.g., PHY layer 102, MAC layer 104, and higher layers 106) in accordance with an example embodiment. In another aspect, the context manager 120 may maintain a context database to support various context operations (e.g., context update, context retrieve, context subscription, etc.) initiated by the high layers 106, MAC layer 104, and/or PHY layer 102. Each row in Table 5 represents a specific interaction between a Requester (e.g., a PRL or CM) and a Receiver (e.g., CM or PRL) via an SAP (e.g., HLCM SAP 122, MLCM SAP 124, and/or PLCM SAP 126). For example, the first row in Table 5 means that a protocol layer (PRL) can be a requester and can create new context information at the context manager 120 (the receiver) via any of the above-described SAPs (e.g., HLCM SAP 122, MLCM SAP 124, and PLCM SAP 126).

TABLE 5

Example Context Management Interactions between Context Manager (CM) and Protocol Layers (PRL)

| Interactions | Requester | Receiver | HLCM SAP | MLCM SAP | PLCM SAP |
| --- | --- | --- | --- | --- | --- |
| Create new context information | PRL | CM | ✓ | ✓ | ✓ |
| Retrieve existing context information | PRL | CM | ✓ | ✓ | |
| Update existing context information | PRL | CM | ✓ | ✓ | ✓ |
| Delete existing context information | PRL | CM | | ✓ | |
| Enable or disable context monitoring | CM | PRL | | | ✓ |
| Search existing context information | PRL | CM | ✓ | ✓ | |
| Search provided context information | CM | PRL | ✓ | ✓ | ✓ |
| Subscription request for specific context information | PRL | CM | ✓ | ✓ | |

TABLE 5-continued

Example Context Management Interactions between Context
Manager (CM) and Protocol Layers (PRL)

| Interactions | Requester | Receiver | HLCM SAP | MLCM SAP | PLCM SAP |
|---|---|---|---|---|---|
| Notify the change in context subscribed | PRL | CM | | ✓ | |
| Subscription request for specific context information | CM | PRL | | ✓ | |
| Notify the change in context subscribed | CM | PRL | ✓ | ✓ | |
| Enable or disable context measurement | CM | PRL | | | ✓ |

In an example embodiment, the context manager 120 can be integrated with a Pad's operating system (e.g., Android, iOS, Windows 7, etc.), and the HLCM SAP 122, MLCM SAP 124, and the PLCM SAP 126 may each be implemented as an application programming interface (API) provided by a chip-set provider for the PD. For example, for a smart tablet that has an IEEE 802.15.8 (or IEEE 802.11) chipset runs Windows 7, the IEEE 802.15.8 (or IEEE 802.11) chipset APIs may include the PLCM SAP 126 for the PHY layer 102 and the CM 120 may be integrated with the OS.

New primitives are now described for exchanging context information over the PLCM SAP 126, the MLCM SAP 124, and the HLCM SAP 122 in accordance with various embodiments. Further, example methods for leveraging those primitives are also described below.

Figure 7A:
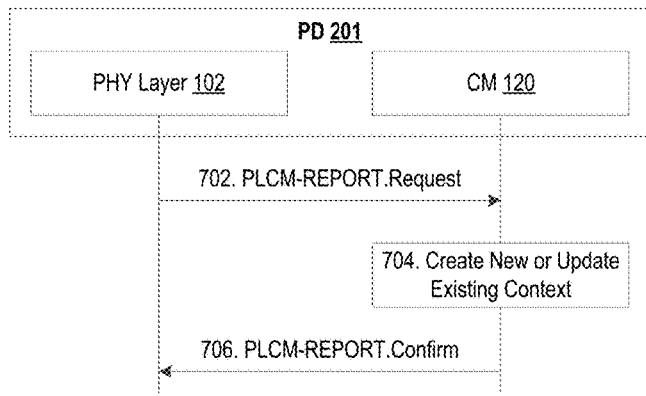
FIG. 7A is a call flow for reporting context information from a physical layer (PHY) to a context manager (CM) in accordance with an example embodiment.
Figure 7B:
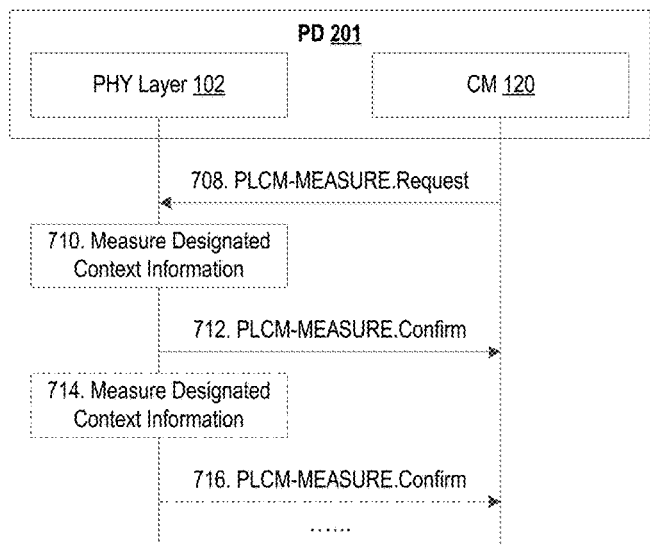
FIG. 7B is a call flow for enabling or disabling a context information at the PHY in accordance with an example embodiment.
Figure 7C:
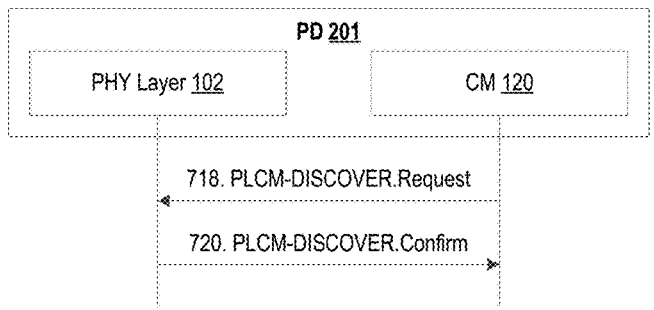
FIG. 7C is a call flow for discovering context information at the PHY in accordance with an example embodiment.

Referring now to FIGS. 7A, 7B, and 7C, various primitives are used in a peer device 201 that includes the CM 120 and the PHY layer 102. Specifically, the following primitives, presented by way of example and without limitation, are defined for the PLCM SAP 126 between the PHY layer 102 and context manager 120 as depicted in FIGS. 7A, 7B, and 7C. Referring to FIG. 7A, at 702, a PLCM-REPORT.Request primitive is set to the CM 120 from the PHY layer 102. Using this primitive, the PHY layer 102 requests to add and/or update context information in the context manager 120. At 704, in response to the request, the CM 120 may create new context information or update existing context information. At 706, using a PLCM-REPORT.Confirm primitive, the CM 120 sends a confirmation to the PHY layer 102.

Referring now to FIG. 7B, at 708, using a PLCM-MEASURE.Request primitive, the context manager 120 requests that context measurement is enabled or disabled at the PHY layer 102. At 710, if the request includes a request to enable designated context measurement, the PHY layer 102 measures the designated context information. At 712, using a PLCM-MEASURE.Confirm primitive, the PHY layer 102 sends a confirmation to the context manager 120. Referring now to FIG. 7C, at 718, using a PLCM-DISCOVER.Request primitive, the context manager 120 requests to search context types that the PHY layer 102 provides. At 720, using a PLCM-DISCOVER.Confirm primitive, a confirmation is sent from the PHY layer 102 to the context manager 120.

Referring again to FIG. 7A, the PLCM-REPORT.Request primitive (at 702) may contain a set of context elements to be created or updated. In an example, each context element consists of a contextName parameter and a contextValue parameter. In addition, a context element can be contained in a standard Information Element (IE) that passes through the PLCM SAP 126. The contextName parameter may identify, for instance by including an identifier, information that should be created or updated. The contextValue parameter may indicate a value of the context information that should be created or updated. In an example embodiment, the contextValue parameter may be excluded from the PLCM-REPORT.Request primitive to indicate that the PHY layer 102 should only report the name or type of context information it provides. The PLCM.REPORT.Confirm primitive may contain results, for instance that indicate a success or failure, associated with each context element contained in the PLCM-REPORT.Request primitive. For example, the PLCM.REPORT.Confirm primitive may contain a result primitive that indicates whether a request for a context element succeeded or failed.

Referring again to FIG. 7B, the PLCM-MEASURE.Request primitive may contain one or more context measurement elements. Each context measurement element may contain the following example parameters, presented by way of example and without limitation: a flag, a contextName, and a measurePeriod. In an example, the flag parameter enables (e.g., if flag=TRUE) or disables (e.g., if flag=FALSE) the measurement of the context information associated with the contextName parameter. Thus, the contextName parameter (e.g., identifier) indicates the context information associated with the measurement. In an example, the measurePeriod parameter represents the frequency of periodical measurement of the context information associated with the contextName. By way of example, if measurePeriod is zero, the associated measurement may be only a one-time measurement. In some cases, this parameter is not required if flag=FALSE. In accordance with the illustrated embodiment, the PLCM.MEASURE.Confirm primitive contains a set of context elements as the measurement results for each context measurement element as contained in PLCM-MEASURE.Request primitive. As shown in FIG. 7B, one PLCM-MEASURE.Request primitive at 708 may generate multiple PLCM-MEASURE.Confirm primitives (e.g., 712 and 716). For example, the PLCM-MEASURE.Request primitive may trigger periodic measurements (e.g., 710 and 714) at the PHY layer 102 and each of the measurements may generate a PLCM-MEASURE.Confirm primitive. In another example, one PLCM-MEASURE.Confirm may contain one, for instance only one, context element. Each context element may contain the following parameters, presented by way of example and without limitation: contextName, contextValue, and result. The contextName parameter name (e.g., an identifier) may identify context information that should be created or updated. The contextValue parameter may indicate the value of the context information that should be created or updated. The result parameter may indicate whether the measurement was successful or failed. If the result is failure, contextName and contextValue is not included in PLCM-MEASURE. Confirm primitive in accordance with one example, and the CM 120 may issue another PLCM-MEASURE.Request.

Referring again to FIG. 7C, the PLCM-DISCOVER.Request primitive may contain a set of search criteria, which may be represented by a searchCriteria context element. The search criteria element may be used for discovering corresponding context names or context types. The search criteria may include various parameters, such as, for example, contextName, keywords related to contextName, etc. At 720, the PLCM.DISCOVER.Confirm primitive may contain a set of context elements that match the searchCriteria contained in the PLCM-DISCOVER.Request primitive. Each element may contain parameters, for instance the contextName and contextValue parameters. In an example case, when this primitive contains no context elements, it means that no context information matched the searchCriteria.

It will be understood that the contextName parameter described herein may be exchanged over the PLCM SAP 126, HLCM SAP 122, and the MLCM SAP 124, and may be a full name or a partial name. For example, a partial name may be a key word related to one or more full names. In another example, if the full name is a structured name including multiple parts, the partial name may be one of those parts. In some cases, if the contextName is a partial name, the CM 120 analyzes the partial name and finds corresponding full name(s) that match(es) the partial name.

Figure 8A:
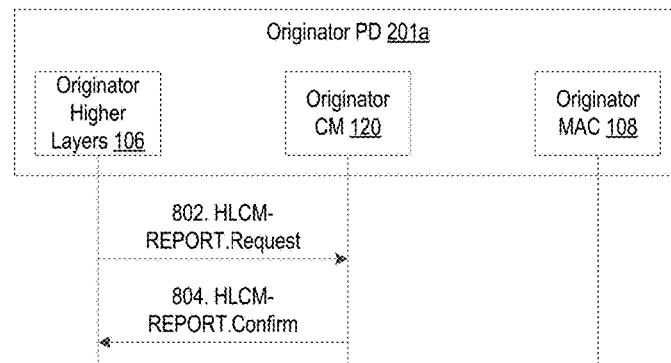
FIGS. 8A-B is a call flow that shows an example method and example primitives for reporting context information from high layer to context manager where the context manager is not a part of the MAC layer in accordance with example embodiments.
Figure 8B:
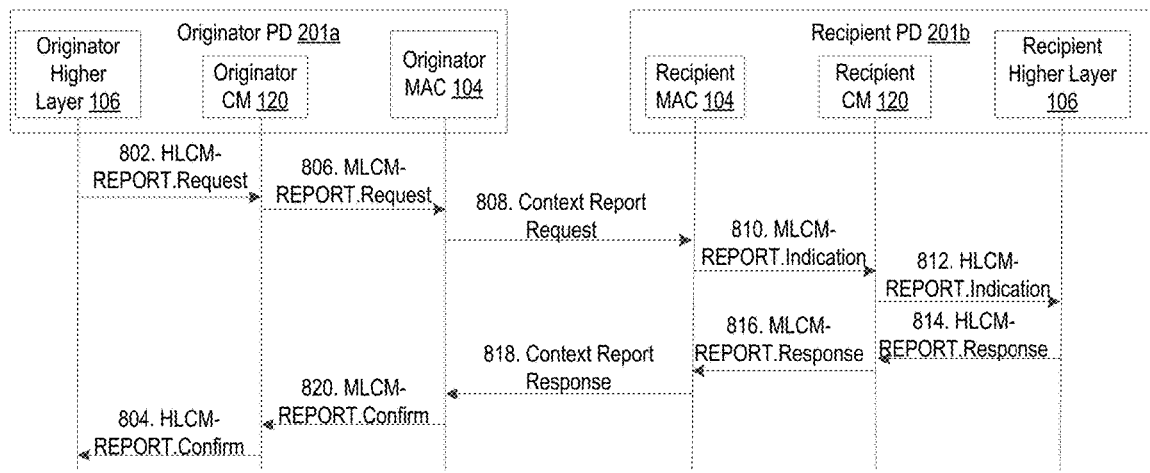

Referring now to FIGS. 8A-B, various primitives are used by a peer device 201a that includes the CM 120, the higher layers 106, and the MAC layer 104. In the illustrated examples, the peer device 201a sends a request, and thus the peer device 201a may also be referred to as a requestor 201a or an originator 201a. FIGS. 8A-B shows example call flows using example primitives for reporting context information from the higher layers 106 to the context manager 120, where the context manager 120 is not a part of the MAC layer 104. FIG. 8A illustrates an example local context information reporting scenario and FIG. 8B illustrates an example remote information reporting scenario.

Referring first to FIG. 8A, in accordance with the illustrated example, at 802, the higher layer 106 of the PD 201a sends a HLCM-REPORT.Request primitive to the context manager 120 of the PD 201a. The primitive contains the contextName and contextValue parameters, as described above. At 804, the CM 120 of the PD 201a sends a HLCM-REPORT.Confirm primitive to the high layer 106. This primitive contains the result associated with the request (e.g., successful or failed).

Referring to FIG. 8B, in accordance with the illustrated example, the HLCM-REPORT.Request primitive that is sent at 802 contains a contextName parameter, a contextValue parameter, and identifiers of one or remote peer devices. In accordance with the illustrated example, one of the identifiers corresponds to a peer device 201b, which can also be referred to as a recipient PD 201b. At 806, the context manager 120 of the originator PD 201a sends an MLCM-REPORT.Request primitive to the context manager 120 of the PD 201a. This primitive contains contextName, contextValue, and identifiers of the one or more remote peer devices. At 808, the MAC layer 104 of the PD 201a sends a Context Report Request message over the air to the MAC layer 104 of the recipient PD 201b. This message may contain various parameters including the contextName, contextValue, etc. At 810, the MAC layer 104 of the recipient PD 201b sends a MLCM-REPORT.Indication primitive to the context manager 120 of the PD 201b. At 812, in accordance with the illustrated example, the context manager of the PD 201b sends a HLCM-REPORT.Indication primitive to the higher layer 106 of the PD 201b. At 814, the higher layer 106 of the recipient PD 201b sends a HLCM-REPORT.Response primitive to the context manager 120 of the PD 201b. At 816, the CM 120 of the PD 201b sends a MLCM-REPORT.Response primitive to the MAC layer 104 of the PD 201b. At 818, in accordance with the illustrated example, the MAC layer 104 of the PD 201b sends a Context Report Response message over the air to the MAC layer 104 of the PD 201a. This message may contain parameters such as, for example, the contextName and the context report result (e.g., successful or failure). At 820, the originator MAC layer 104 sends a MLCM-REPORT.Confirm primitive to the originator context manager 120 to indicate the context report result (e.g., successful or failure). At 804, CM 120 of the PD 201a sends the HLCM-REPORT.Confirm primitive described above to the higher layer 106 of the PD 201a.

Figure 9:
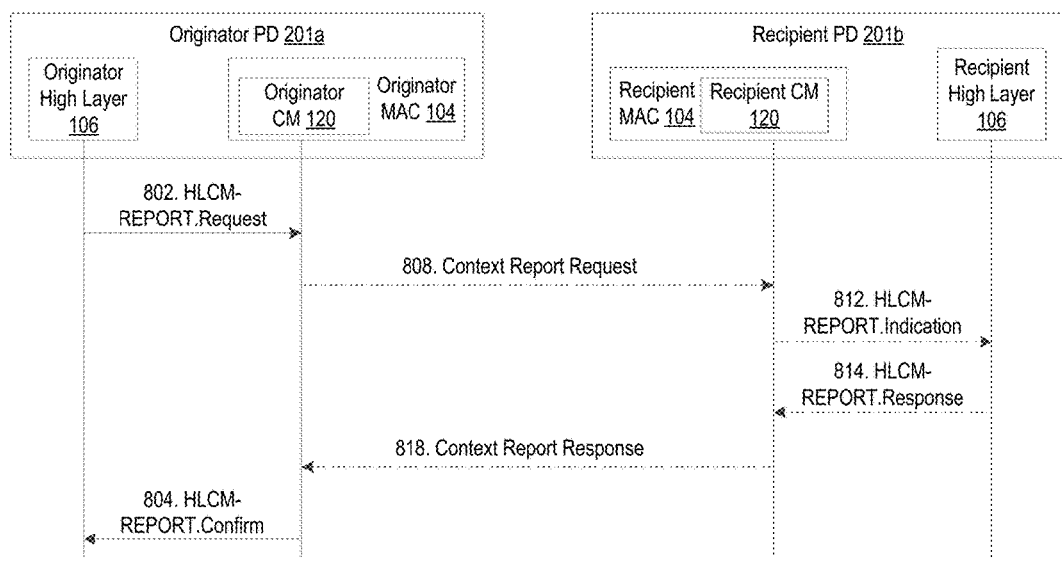
FIG. 9 is a call flow that shows an example procedure and example primitives for reporting context information from high layer to context manager where the context manager is a part of the MAC layer in accordance with an example embodiment.

FIG. 9 shows an example in which the context manager 120 of the originator PD 201a is a part of the MAC layer 104, and the context manager 120 of the recipient PD 201b is a part of the MAC layer 104, in accordance with an example embodiment. The steps are described with reference to FIGS. 8A and 8B, and thus reference numbers in FIG. 9 are repeated from FIGS. 8 8A and 8B. It will be understood that in an example embodiment in which only local context information (e.g., information associated with the PD 201a) is reported, steps 808, 812, 814, and 818 are not performed. Referring to 802, the HLCM-REPORT.Request primitive may contain a set of context elements to be created or updated. Each context element may consist of parameters, for example and without limitation, a contextName parameter, a contextValue parameter, and a peerID parameter. The contextName parameter may identify the context information that is requested to be created or updated. The contextValue parameter may indicate the context information value that requested to be created or updated. In an example, if this parameter is not included, it means that the high layer 106 only reports the name or type of context information it provides The peerID parameter may identify one or more remote peer devices (e.g., recipient 201b) that should report their context in accordance with the request. This parameter may contain multiple identifiers, for example, if the high layer 106 of the originator 201b requests that context information be updated at multiple remote peer devices. Referring to 812, the HLCM-REPORT.Indication primitive may contain one or more, for instance a set, of context elements that are received from the originator 201a. Each context element may consist of one or more parameters, such as, for example, the contextName parameter, which identifies the context information associated with the request; the contextValue parameter, which is indicative of the value of the requested context information; and the peerID, which identifies the originator 201a for reporting of the requested remote context information.

With continuing reference to FIGS. 8A-B and 9, at 814, the HLCM-REPORT.Response primitive may contain a simple acknowledgement of the HLCM-REPORT.Indication primitive that is received. Referring to 804, the HLCM.REPORT.Confirm primitive may contain one or more results, for instance a set of result elements, associated with each context element that was as indicated in the HLCM-REPORT.Request primitive. Each result element may contain one or more parameters, for instance and without limitation: the contextName parameter, the result parameter, and the peerID parameter, which may identify the remote peer device (e.g., peer 201b) that sends back the remote context report response at 818.

Figure 10A:
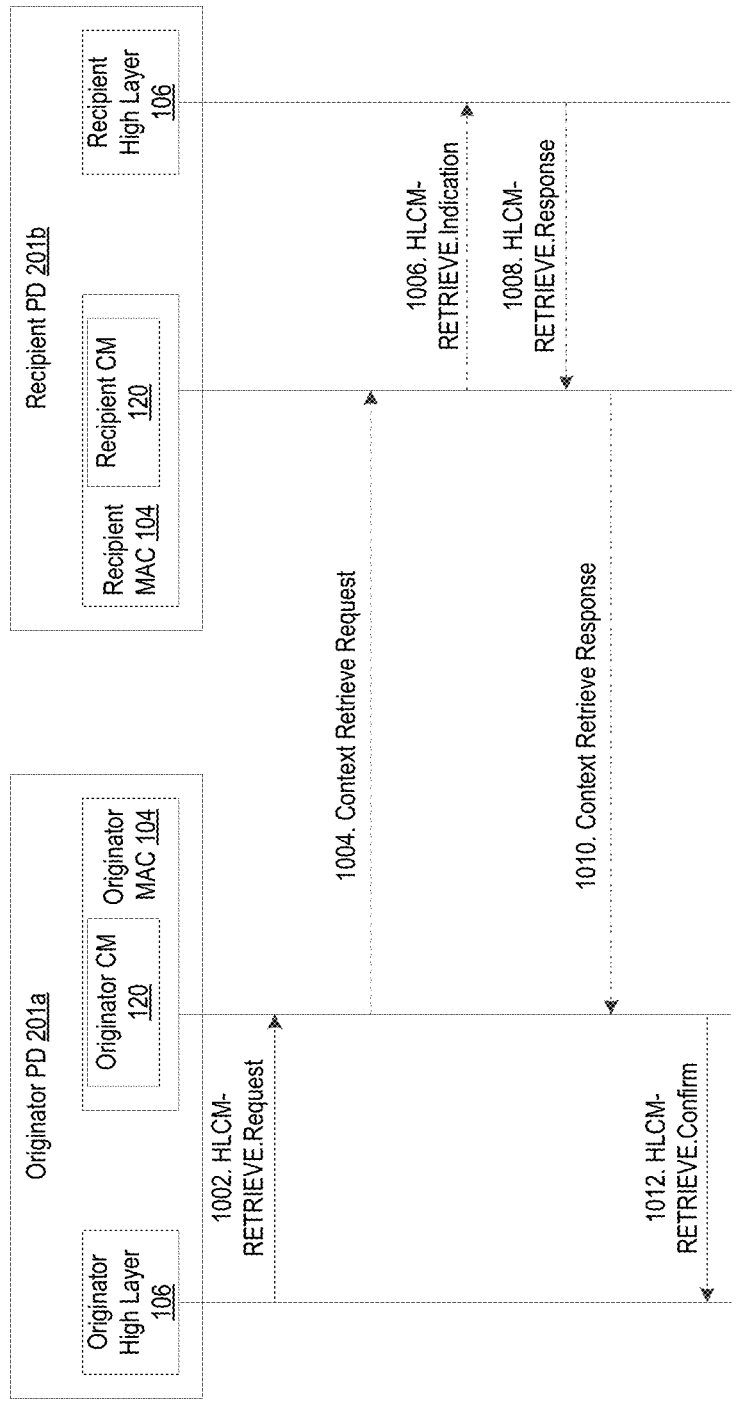
FIGS. 10A-B are call flows that show example methods and primitives for a high layer to retrieve context information in accordance with example embodiments.
Figure 10B:
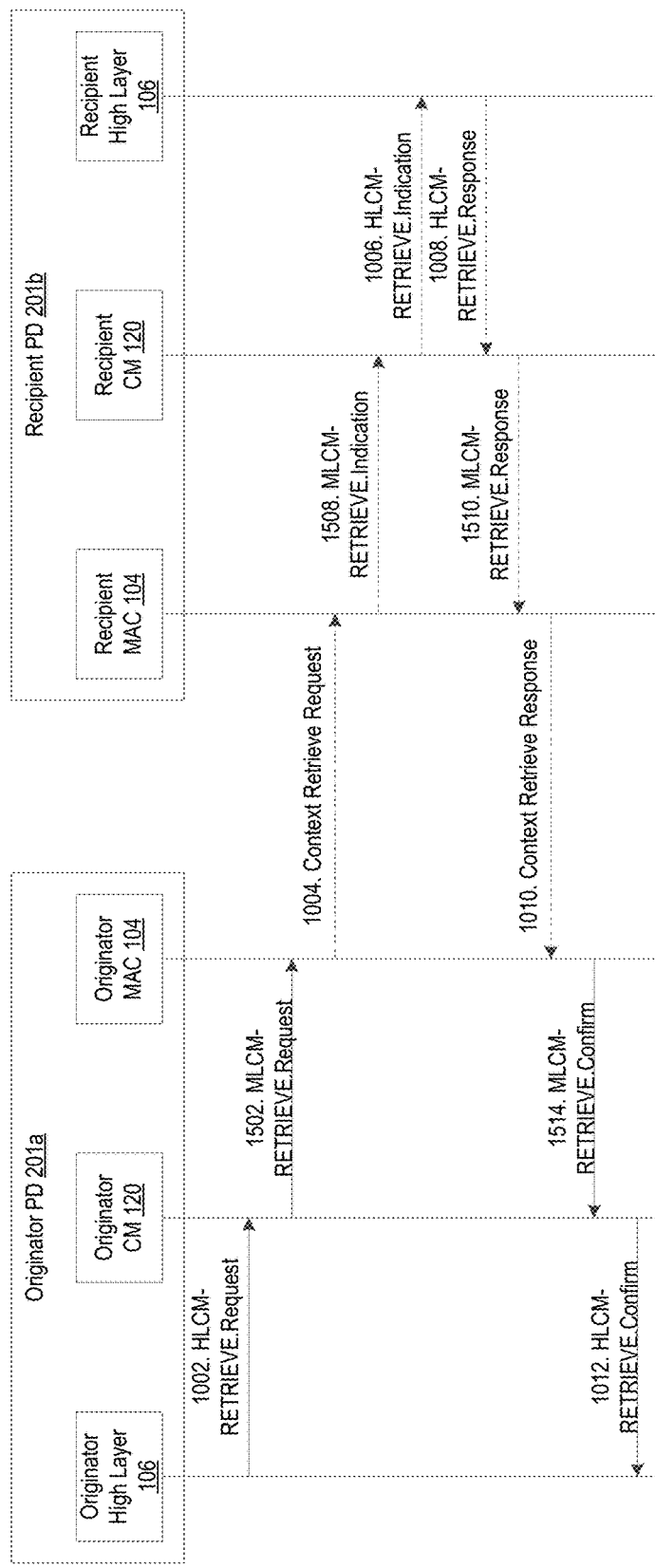

Referring now to FIGS. 10A and 10B, the higher layers 106, for instance the application layer, may retrieve context information from a local context manager 120 or a remote context manager 120. FIG. 10A shows an example call flow in which the context manager 120 is a part of the MAC layer 104, and FIG. 10B shows an example call flow in which the context manager 120 is not part of MAC layer 104. Illustrated steps 1502, 1508, 1510, and 1514 are described further herein with reference to FIG. 15.

Referring to FIGS. 10A and 10B, at 1002, the high layer 106 of the originator PD 201a sends an HLCM-RETRIEVE.Request primitive to the context manager 120 of the PD 201a. In an example, this primitive contains contextName and one or more identifiers associated with one or more remote peer devices, for instance recipient PD 201b. In an example embodiment, the HLCM-RETRIEVE.Request primitive contains a set of context elements that need to be updated. Each context element may consist of one or more, for instance two, parameters such as, for example and without limitation, the contexName parameter and the peerID parameter. The contextName parameter identifies the context information that is being retrieved by the higher layer 106 of the PD 201a. The peerID parameter identifies remote peer devices (e.g., recipient PD 201b) from which context information is being retrieved. This parameter may contain multiple identifiers, for example, if the high layer 106 wants to retrieve context information from multiple remote peer devices.

At 1004, in accordance with the illustrated example, the MAC layer 104 at the PD 201a sends a Context Retrieve Request message over the air to the MAC layer 104 of the recipient 201b. This message may contain, for example, the contextName parameter. At 1006, the context manager 120 of the recipient 201b sends an HLCM-RETRIEVE.Indication primitive to the higher layer 106 of the PD 201b. The HLCM-RETRIEVE.Indication primitive may contain a set of context elements received from the originator PD 201a. Each context element may consist of one or more, for instance two, parameters, such as, for example the contextName parameter and the peerID parameter. Here, the peerID parameter may identify the originator PD 201a, and the contexName parameters identifies the context information that is being retrieved. At 1008, the high layer 106 of the recipient PD 201b sends an HLCM-RETRIEVE.Response primitive to the context manager 120 of the recipient PD 201b. In an example embodiment, the HLCM-RETRIEVE.Response primitive contains an acknowledgement of the HLCM-RETRIEVE.Indication primitive, and may contain a contextValue corresponding to the contextName. At 1010, in accordance with the illustrated example, the MAC layer 104 of the recipient PD 201b sends a Context Retrieve Response message over the air to the MAC layer of the PD 201a. This message may contain various information, such as, for example, the contextValue and contextName parameters. At 1012, the context manager 120 of the PD 201a sends a HLCM-RETRIEVE.Confirm primitive to the high layer 106 of the PD 201a. The HLCM-RETRIEVE.Confirm primitive may contain a set of result elements associated with each received context element as indicated in the HLCM-RETRIEVE.Request primitive. Each result element may contain one or more, for instance three, parameters such as, for example, the contextName, contextValue, and peerID. For example, the peerID parameter may identify the remote peer device 201a that sends back the response to the context retrieval request. The contextValue parameter identifies the value of the context information. In one embodiment, context information is retrieved locally from the PD 201a, and thus steps 1004, 1006, 1008, and 1010 are not performed.

Figure 11A:
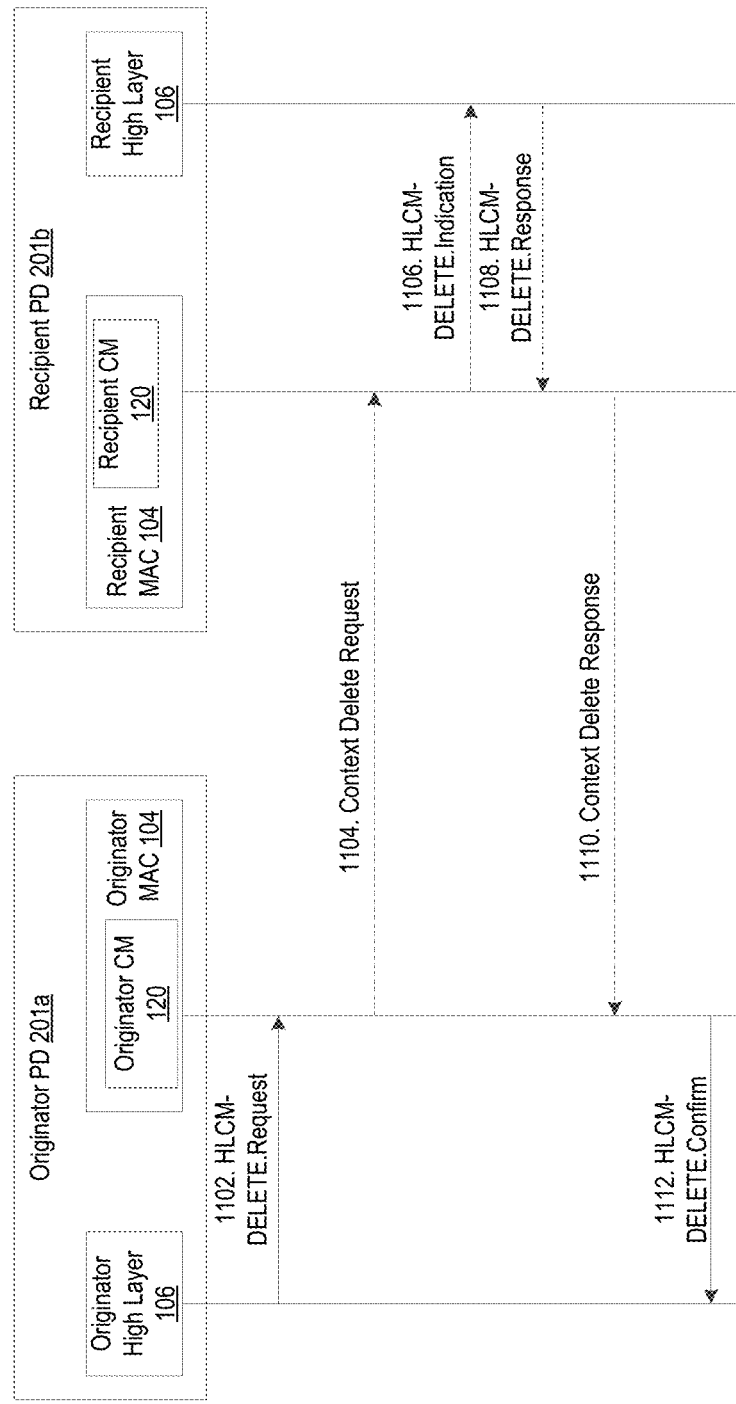
FIGS. 11A-B are call flows that show example methods and primitives for the high layer to delete context information in accordance with example embodiments.
Figure 11B:
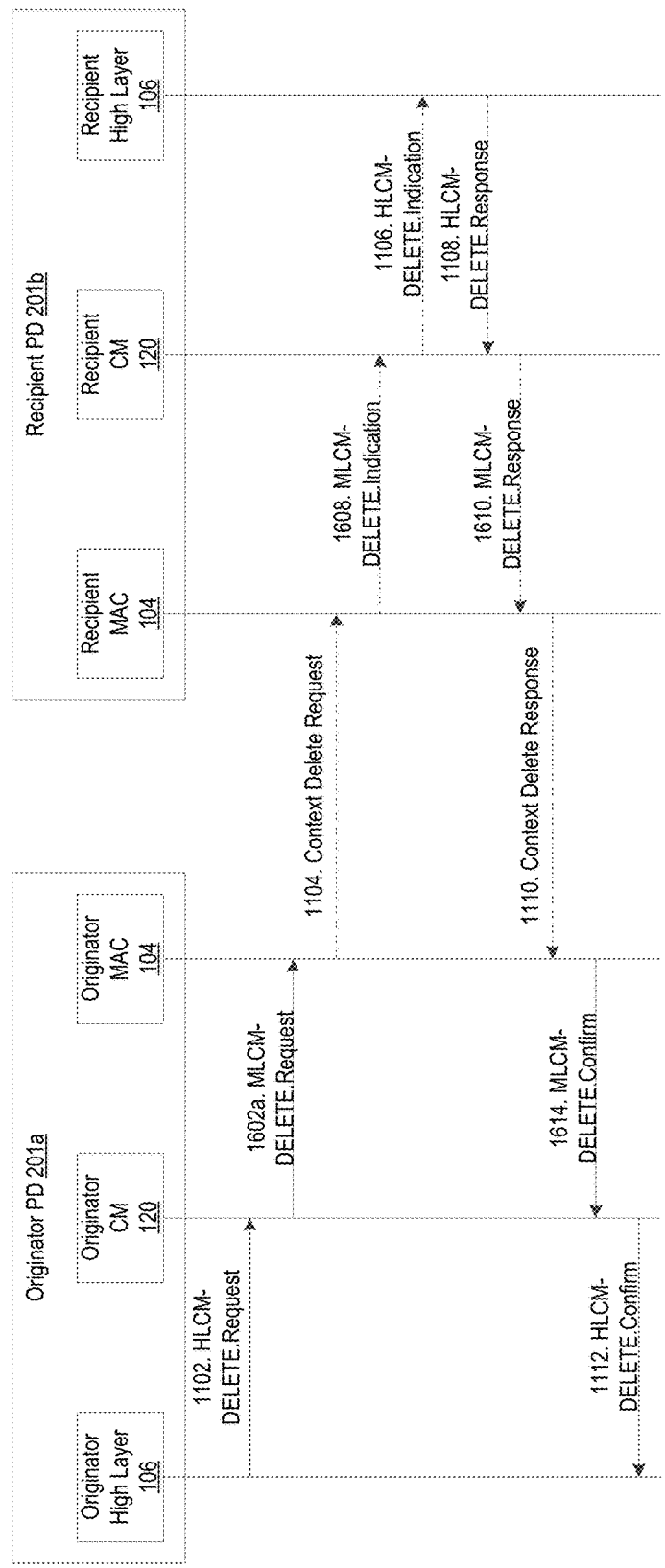

Referring now to FIGS. 11A and 11B, the higher layer 106, for instance an application layer, may delete context information in accordance with an example embodiment. Context information can be deleted from a local context manager or a remote context manager. FIG. 11A shows an example call flow in which the context manager 120 is a part of the MAC layer 104, and FIG. 11B shows an example call flow in which the context manager 120 is not a part of MAC layer 104. Steps 1602a, 1608, 1610, and 1614 are further described below with reference to FIG. 16.

Referring to FIGS. 11A and 11B, in accordance with the illustrated embodiment, at 1102, high layer 106 of the PD 201a sends an HLCM-DELETE.Request primitive to the context manager 120 of the PD 201a. This primitive contains the contextName parameter and identifiers of remote peer devices associated with context information that the high layer 106 of the PD 201a wants to delete. The HLCM-DELETE.Request primitive may contain a set of context elements to be deleted. Each context element consists of one or more, for instance two, parameters, such as for example, the contextName and the peerID. The contextName parameter may identify context information for deletion. The peerID parameter may identify remote peer devices (e.g., PD 201b) that should delete context information. This parameter may contain multiple identifiers, for example, if the high layer 106 of the PD 201a requests that context information is deleted from multiple devices. At 1104, MAC layer 104 of the PD 201a sends a Context Delete Request message over the air to the MAC layer 104 of the recipient PD 201b. In response, at 1106, the context manager 120 of the PD 201b sends a HLCM-DELETE.Indication primitive to the high layer 106 of the PD 201b. The HLCM-DELETE.Indication primitive may a set of context elements received from the originator PD 201a. Each context element may consist of, for example, the contextName parameter and the peerID parameter. Here, the peerID parameter may identify the originator peerID 201a. At 1108, the high layer 106 of the PD 201b sends an HLCM-DELETE.Response primitive to the context manager 120 of the PD 201b. The HLCM-DELETE.Response primitive may contain an acknowledgement of the HLCM-DELETE.Indication primitive. At 1110, the MAC layer 104 of the recipient 201b sends a Context Delete Response message over the air to the MAC layer 104 of the PD 201a. This message may contain the contextName and a context deletion result (e.g., success or fail). At 1112, the context manager 120 of the PD 201a sends an HLCM-DELETE.Confirm primitive to high layer 106 of the PD 201a to indicate the context deletion result (e.g., success or fail). In an example, the HLCM-DELETE.Confirm primitive contains a set of result elements for each received context element as indicated in the HLCM-DELETE.Request primitive. Each result element may contain one or more parameters, such as, for example, the contextName primitive, the result primitive, and the peerID primitive. In accordance with the illustrated example, the result primitive may indicate whether the context information was successfully deleted. The peerID primitive identifies the remote peer device (e.g., peer 201b) that sends back the context delete response. In one embodiment, context information is deleted locally from the originator PD 201a, and thus steps 1104, 1106, 1108, and 1110 are not performed.

Figure 12A:
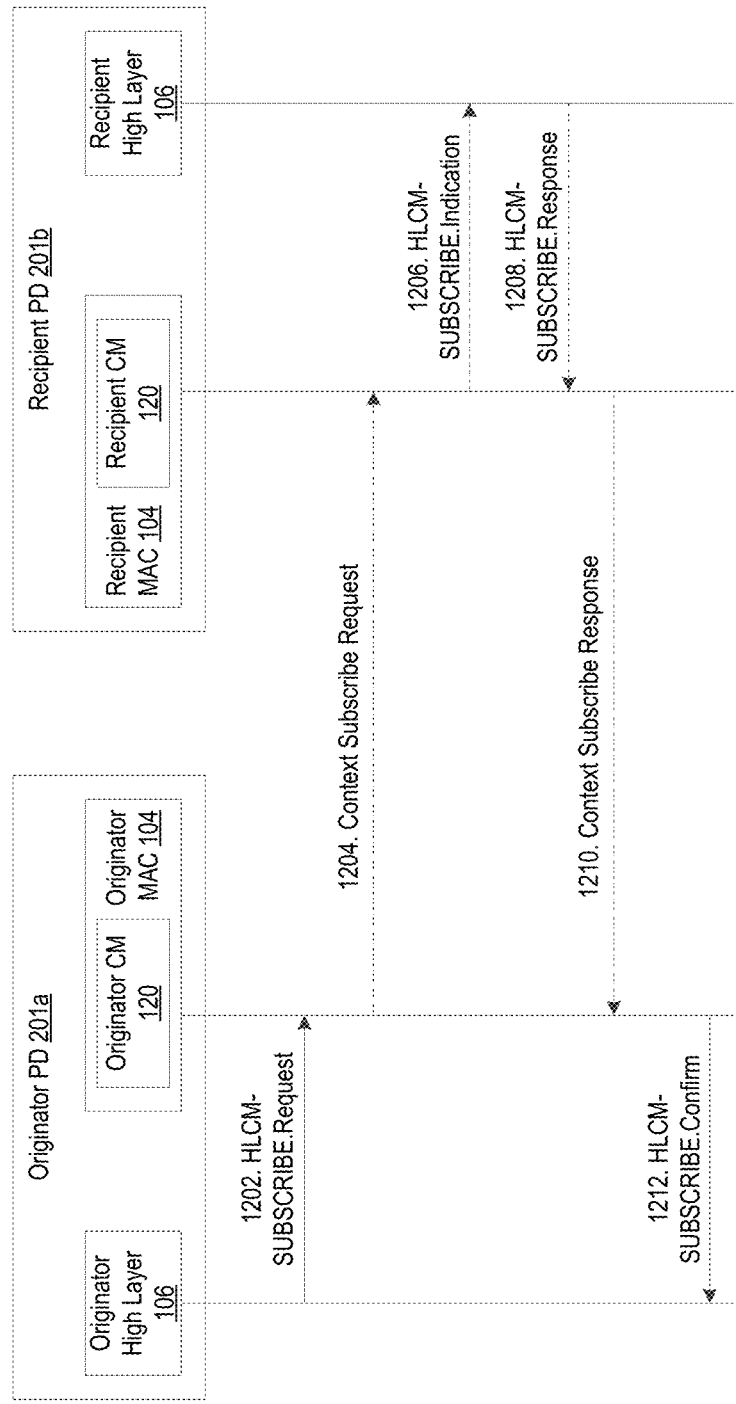
FIGS. 12A-B are call flows that show example methods and primitives for the high layer to subscribe to context information in accordance with example embodiments.
Figure 12B:
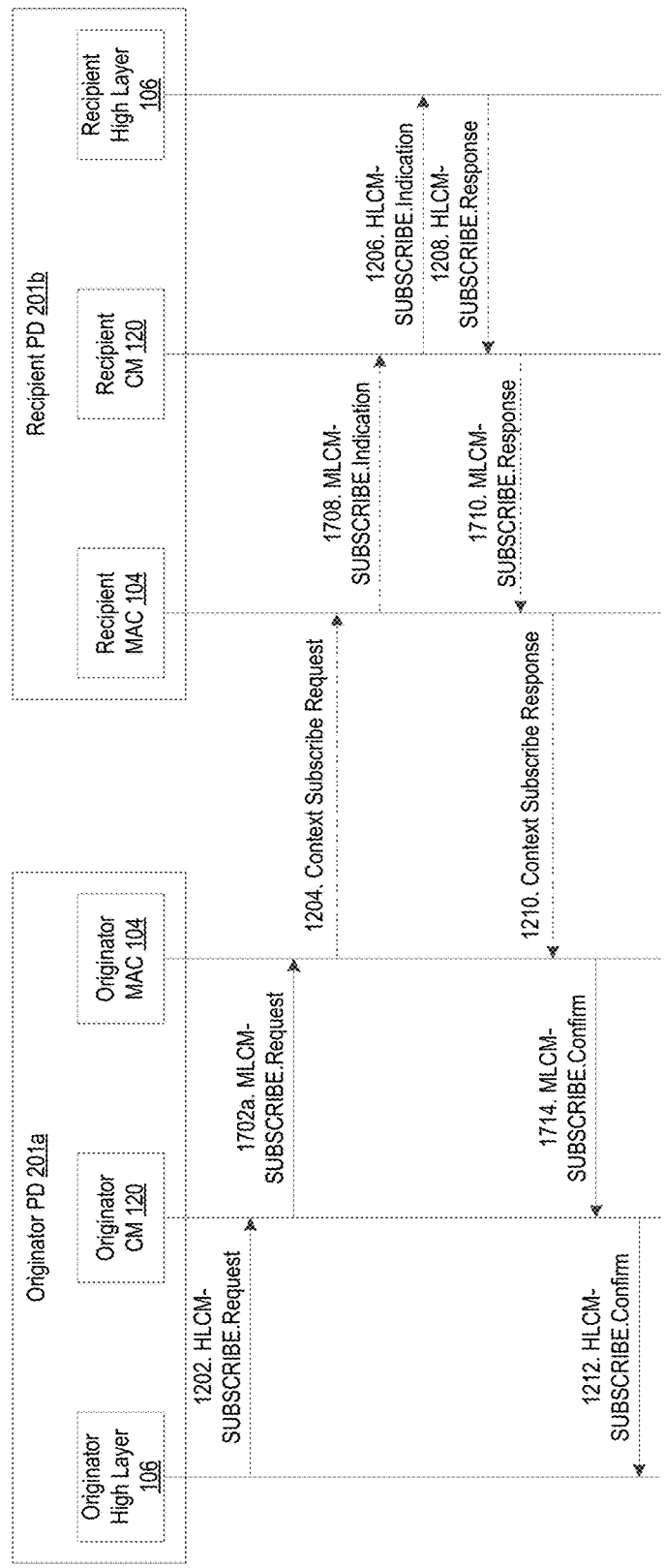

Referring now to FIGS. 12A and 12B, the higher layers 106, for instance an application layer, may subscribe to context information in accordance with an example embodiment. The high layer 106 can subscribe to context information from a local context manager or a remote context manager. FIG. 12A shows an example call flow for context subscription in which the context manager 120 is a part of the MAC layer 104. FIG. 12B shows an example call flow for context subscription in which the context manager 120 is not a part of MAC layer 104. Steps 1702a, 1708, 1710, and 1714 are described further below with reference to FIG. 17.

At 1202, as shown, the high layer 106 of the originator PD 201a sends an HLCM-SUBSCRIBE.Request primitive to the context manager 120 of the PD 201a. This primitive may contain a set of context elements to which the high layer 106 wants to subscribe. Each context element may include parameters, such as, for example, a contextName parameter, a subscriptionCriteria parameter, a timeDuration parameter, and a peerID parameter. The contextName parameter may identify the context information associated with the subscription. The subscriptionCriteria parameter may indicate a condition or criteria. If the condition or criteria is met, a notification may be provided to the subscribing device. A condition may be a predetermined frequency or a time interval without receiving a notification. The timeDuration parameter may indicate the lifetime of the requested subscription. The peerID parameter may identifier one or more peer devices (e.g., recipient PD 201b) to which the PD 201a wants to subscribe. At 1204, in accordance with the illustrated example, the MAC layer 104 of the originator 201a sends a Context Subscribe Request message over the air to the MAC layer 201b of the recipient 201b. This message may contain various information, such as the information included in the request primitive at 1202. At 1206, context manager 120 of the recipient PD 201b sends an HLCM-SUBSCRIBE.Indication primitive to the high layer 106 of the recipient 201b. The HLCM-SUBSCRIBE.Indication primitive may contain a set of context elements received from the originator PD 201a. Each context may include, for example, the contextName parameter, which indicates context information associated with the subscription request, and the peerID parameter, which identifies the originator PD 201a of the subscription request. At 1208, the high layer 106 of the recipient PD 201b sends a HLCM-SUBSCRIBE.Response primitive to the context manager 120 of the recipient PD 201b. The HLCM-SUBSCRIBE.Response primitive may contain an acknowledgement of the HLCM-SUBSCRIBE.Indication primitive. At 1210, the MAC layer 104 of the recipient PD 201b sends a Context Subscribe Response message over the air to the MAC layer 104 of the originator 201a. This message may contain various information, such as, for example, the contextName and the context subscription result (e.g., success or fail). At 1212, in accordance with the illustrated embodiment, the context manager 120 of the originator PD 201 sends a HLCM-SUBSCRIBE.Confirm primitive to the high layer 106 of the originator PD 201a to indicate the context subscription result (e.g., success or fail). The HLCM-SUBSCRIBE.Confirm primitive may contain a set of result elements for each context element indicated in HLCM-SUBSCRIBE.Request primitive. Each result element may contain one or more parameters, for example the contextName parameter, the timeDuration parameter, and the peerID parameter. Here, the contextName parameter identifies the context information associated with the subscription. The timeDuration parameter may indicate a lifetime of the subscription. In one example, the lifetime may be assigned by the PD 201b. In some cases, a lifetime value of 'zero' indicates that the subscription request was rejected. The peerID parameter identifies the remote device associated with the subscription. In accordance with the illustrated example, the peerID parameter identifies the PD 201b that sent the response to the subscription request.

Figure 13A:
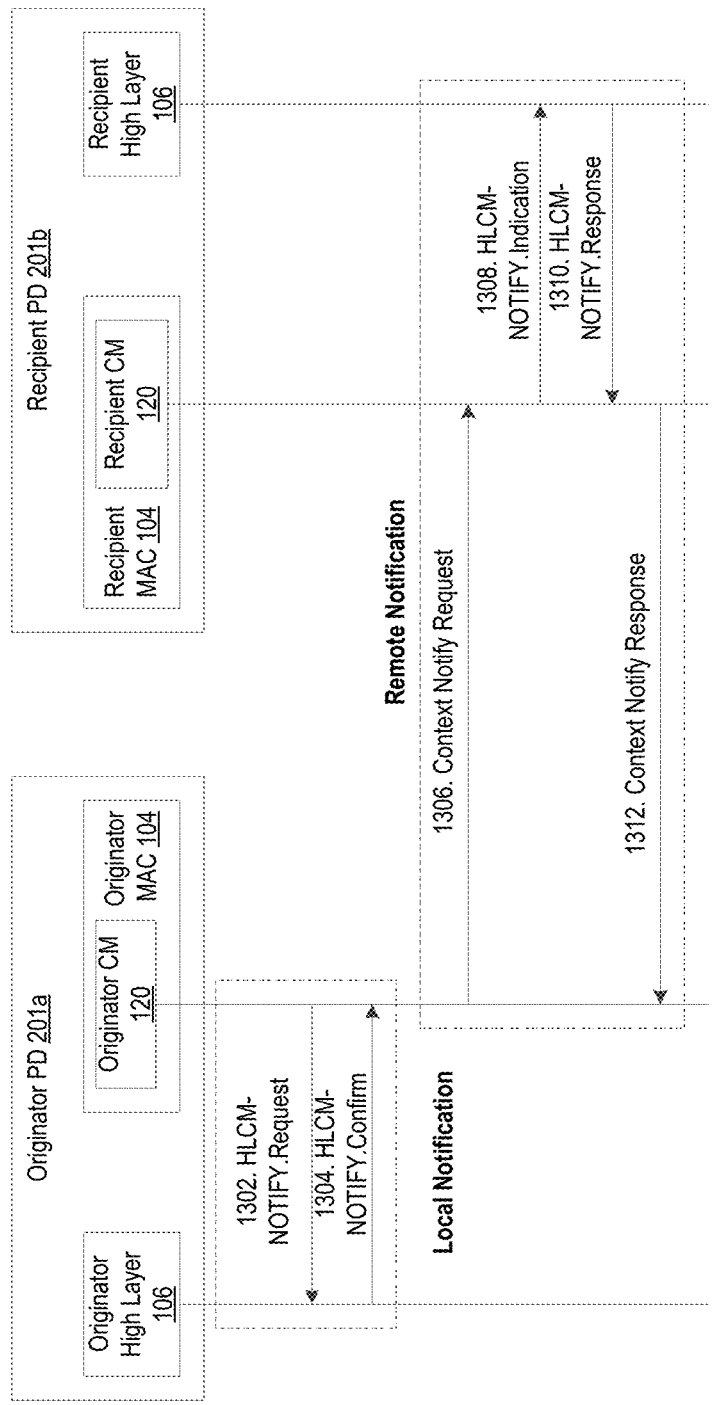
FIGS. 13A-B are call flows that show example methods and primitives for the context manager to notify context information in accordance with example embodiments.
Figure 13B:
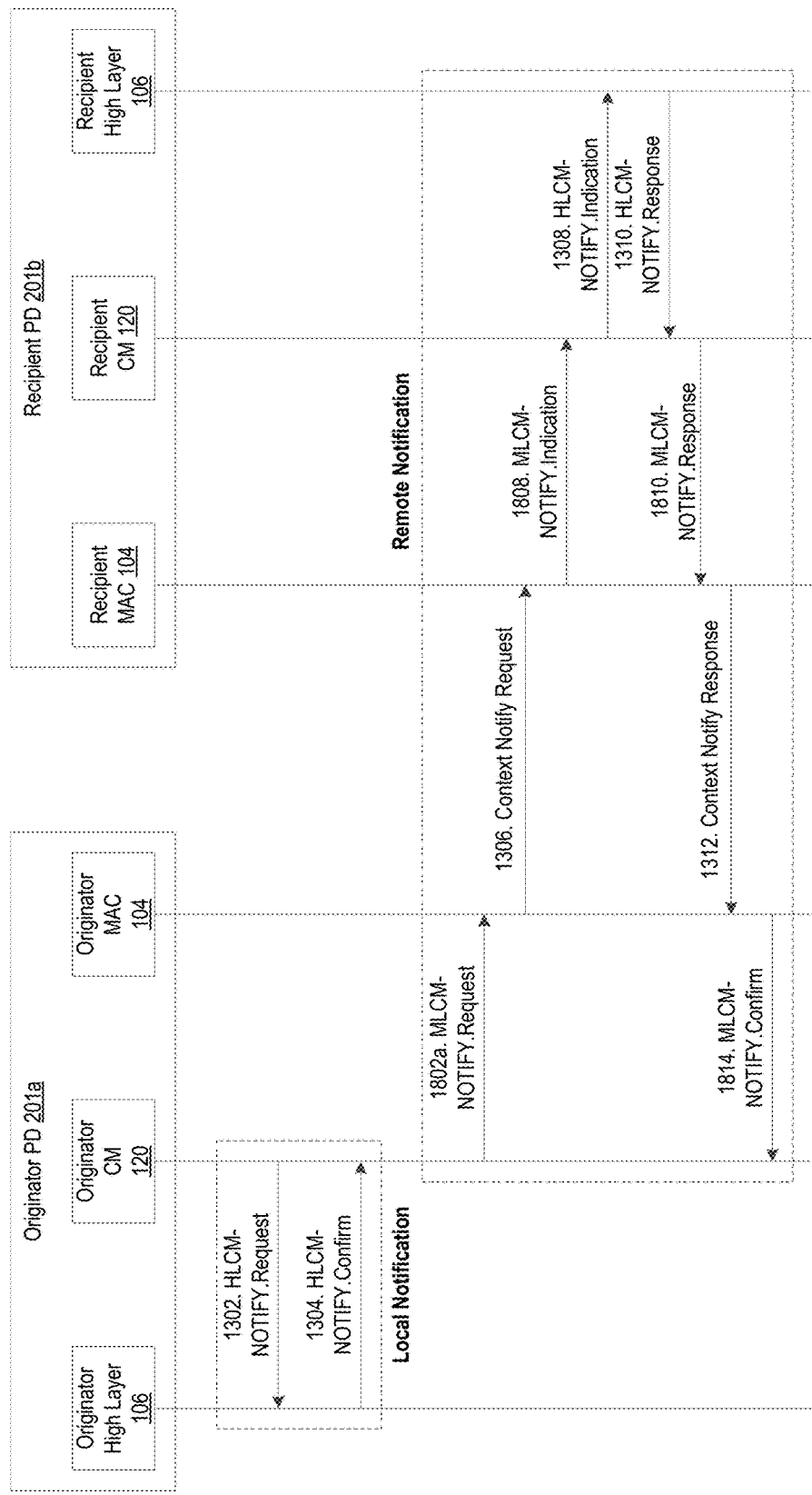

Referring now to FIGS. 13A and 13B, the context manager 120 provides a notification to the recipient PD 201b. FIG. 13A shows an example call flow in the context manager 120 is a part of the MAC layer 104, and FIG. 13B shows an example call flow in which the context manager 120 is not a part of the MAC layer 104. Illustrated steps 1802a, 1808, 1810 and 1814 are further described herein with reference to FIG. 18.

In accordance with one embodiment, steps 1302 and 1304 are used in local context notification and steps 1306, 1308, and 1310 are used in remote context notification. At 1302, the context manager 120 of the originator PD 201a (originator context manager 120) sends an HLCM-NOTIFY.Request primitive to the high layer 106 of the originator PD 201a. The HLCM-NOTIFY.Request primitive may contain a set of context elements, each of which may include one or more parameters, such as, for example, the contextName, contextValue, and peerID. Here, the contextName identifies the context information associated with the notification. The contextValue indicates the value of context information associated with the notification. The peerID parameter may identify devices (e.g., PD 201b) associated with the notification. In an example, this parameter is not required for local context information notification. At 1304, the high layer 106 of the originator PD 201a (originator high layer 106) sends a HLCM-NOTIFY.Confirm primitive to the context manager 120 of the originator PD 201a. At 1306, in accordance with the remote notification example, the MAC layer 104 of the PD 201a (originator MAC layer 104) sends a Context Notify Request message over the air to the MAC layer 104 of the PD 201b (recipient MAC layer 104). This message may contain various information such as, for example, contextName, contextValue, etc. At 1308, the context manager 120 of the PD 201b sends a HLCM-NOTIFY.Indication primitive to the recipient high layer 106. At 1310, the recipient high layer 106 sends a HLCM-NOTIFY.Response primitive to the recipient context manager 120. At 1312, the recipient MAC layer 104 sends a Context Notify Response message over the air to the originator MAC layer 104 as an acknowledgement. As described above, the HLCM-NOTIFY.Confirm primitive may contain the contextName parameter and the peerID parameter. The contextName parameter may identify the context information associated with the notification. Here, the peerID parameter may identify the recipient device associated with the remote notification.

Figure 14:
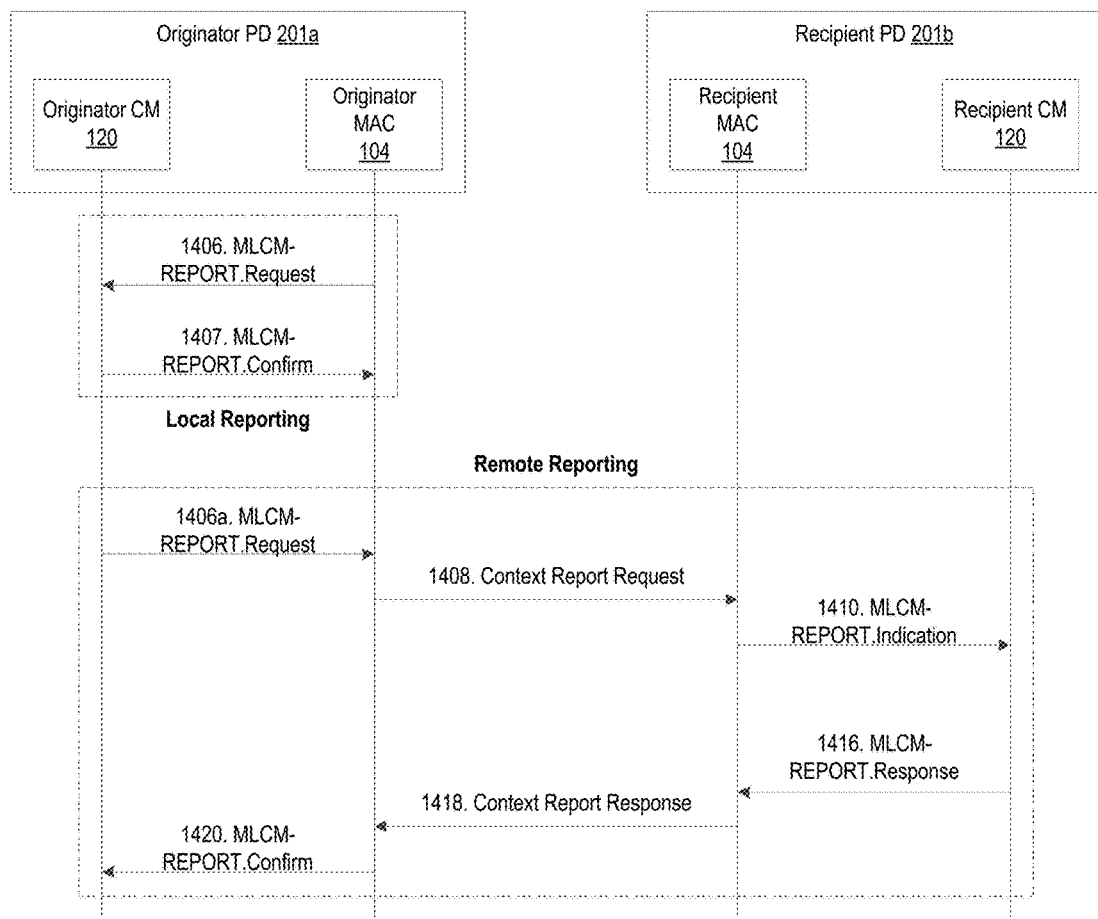
FIG. 14 is a call flow that shows an example method for reporting context information in accordance with another example embodiment.

Referring now to FIG. 14, examples of reporting context information are shown. At 1406, in accordance with a local reporting example, the MAC layer 106 of the originator PD 201a sends an MLCM-REPORT.Request primitive to the context manager 120 of the PD 201a. At 1407, the context manager 120 of the PD 201a sends a MLCM-RETRIEVE.Confirm primitive to the MAC layer 104 of the PD 201a. The MLCM-RETRIEVE.Confirm primitive may contain a set of result elements associated with each context element indicated in the MLCM-RETRIEVE.Request primitive. Each result element may contain one or more parameters such as, for example, the contextName and contextValue parameters. For example, the contextValue parameter identifies the value of the context information.

Still referring to FIG. 14, a remote reporting example of reporting context information associated with a remote device is depicted. At 1406a, the originator context manager 120 sends the MLCM-REPORT.Request primitive to the originator MAC layer 104. The MLCM-REPORT.Request primitive may contain a set of context elements associated with an update or creation request. Each context element may consist of the contextName parameter, the peerID parameter, and the contextValue parameter, as described above with reference to FIGS. 8A and 8B. At 1408, the originator MAC layer 104 sends the Context Update Request message over the air to the recipient MAC layer 104. This message may contain various information such as, for example, values, names, and peer identifiers associated with the request for context information. At 1410, the recipient MAC layer 104 sends the MLCM-REPORT.Indication primitive to the recipient context manager 120. At 1416, the recipient context manager 120 sends the MLCM-REPORT.Response primitive to the recipient MAC layer 104. At 1418, the recipient MAC layer 104 sends a Context Update Response message over the air to the originator MAC layer 104. This message may contain various information such as, for example, a result associated with the report request. At 1420, the originator MAC layer 104 sends the MLCM-REPORT.Confirm primitive to the originator context manager 120. The MLCM.REPORT.Confirm primitive may contain a set of result elements associated with each context element in the request. As further described with reference to FIGS. 8A and 8B, each result element may various parameters, such as the contextName parameter, the result parameter, and the peerID parameter.

Figure 15:
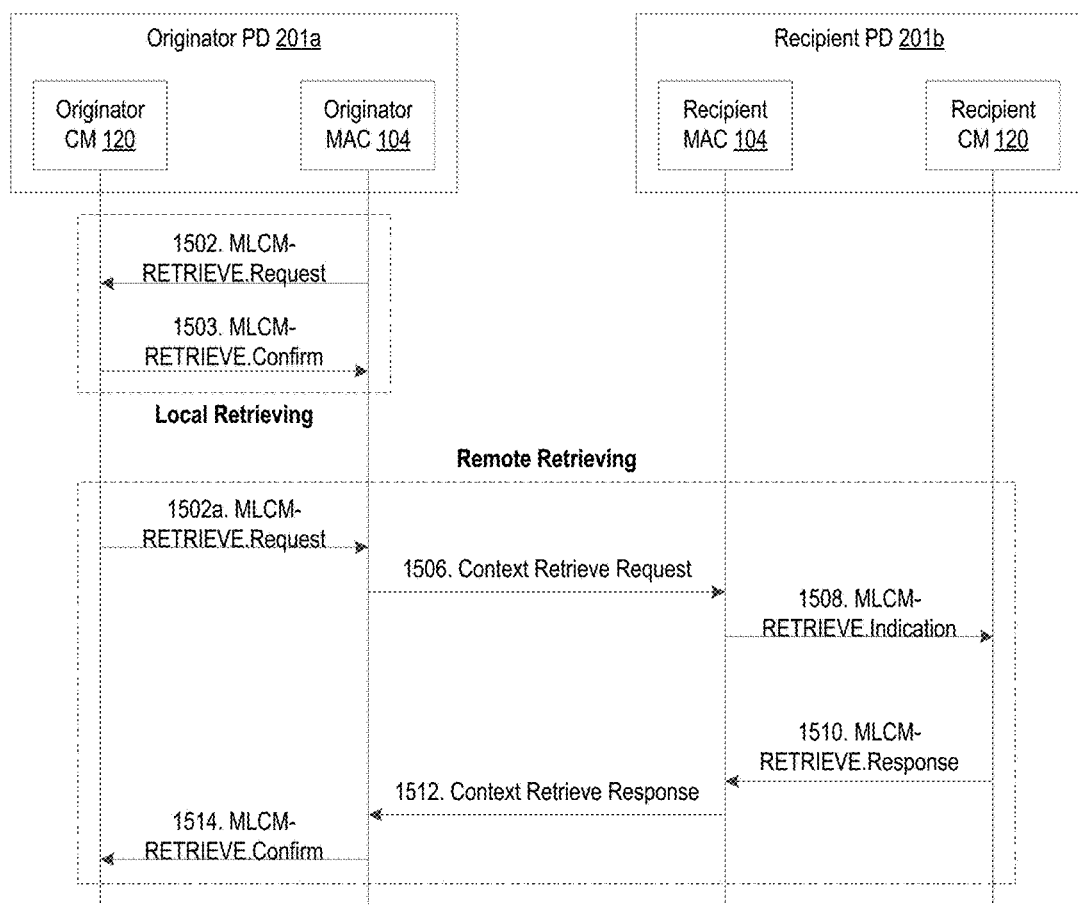
FIG. 15 is a call flow that shows an example method for retrieving context information in accordance with another example embodiment.

Referring now to FIG. 15, examples of retrieving context information are shown. At 1502, in accordance with a local retrieving example, the MAC layer 106 of the originator PD 201a sends an MLCM-RETRIEVE.Request primitive to the context manager 120 of the PD 201a. At 1503, the context manager 120 of the PD 201a sends a MLCM-RETRIEVE.Confirm primitive to the MAC layer 104 of the PD 201a. The MLCM-RETRIEVE.Confirm primitive may contain a set of result elements associated with each context element indicated in the MLCM-RETRIEVE.Request primitive. Each result element may contain one or more parameters such as, for example, the contextName and contextValue parameters. For example, the contextValue parameter identifies the value of the context information.

At 1502a, in accordance with a remote retrieval example, the context manager 120 of the originator PD 201a sends an MLCM-RETRIEVE.Request primitive to the MAC layer 104 of the PD 201a. In an example, this primitive contains contextName and one or more identifiers associated with one or more remote peer devices, for instance recipient PD 201b. In an example embodiment, the MLCM-RETRIEVE.Request primitive contains a set of context elements that need to be updated. Each context element may consist of one or more, for instance two, parameters such as, for example and without limitation, the contexName parameter and the peerID parameter. The contextName parameter identifies the context information that is being retrieved by the MAC layer 104 of the PD 201a. The peerID parameter may identify remote peer devices (e.g., recipient PD 201b in a remote retrieval scenario) from which context information is being retrieved. This parameter may contain multiple identifiers, for example, if the MAC layer 104 wants to retrieve context information from multiple remote peer devices.

At 1506, in accordance with the illustrated example, the MAC layer 104 at the PD 201a sends a Context Retrieve Request message over the air to the MAC layer 104 of the recipient 201b. This message may contain, for example, the contextName parameter. At 1508, the context manager 120 of the recipient 201b sends an MLCM-RETRIEVE.Indication primitive to the CM 120 of the PD 201b. The MLCM-RETRIEVE.Indication primitive may contain a set of context elements received from the originator PD 201a. Each context element may consist of one or more, for instance two, parameters, such as, for example the contextName parameter and the peerID parameter. Here, the peerID parameter may identify the originator PD 201a, and the contexName parameters identifies the context information that is being retrieved. At 1510, the CM 120 of the recipient PD 201b sends an MLCM-RETRIEVE.Response primitive to the MAC layer 104 of the recipient PD 201b. In an example embodiment, the MLCM-RETRIEVE.Response primitive contains an acknowledgement of the MLCM-RETRIEVE.Indication primitive, and may contain a contextValue parameter corresponding to the contextName. At 1512, in accordance with the illustrated example, the MAC layer 104 of the recipient PD 201b sends a Context Retrieve Response message over the air to the MAC layer 104 of the PD 201a. This message may contain various information, such as, for example, the contextValue and contextName parameters. At 1514, the MAC layer 104 of the PD 201a sends a MLCM-RETRIEVE.Confirm primitive to the context manager 120 of the PD 201a. The MLCM-RETRIEVE.Confirm primitive may contain a set of result elements associated with each context element indicated in the MLCM-RETRIEVE.Request primitive. Each result element may contain one or more, for instance three, parameters such as, for example, the contextName, contextValue, and peerID. For example, the peerID parameter may identify the remote peer device 201a that sends back the response to the context retrieval request. The contextValue parameter identifies the value of the context information.

Figure 16:
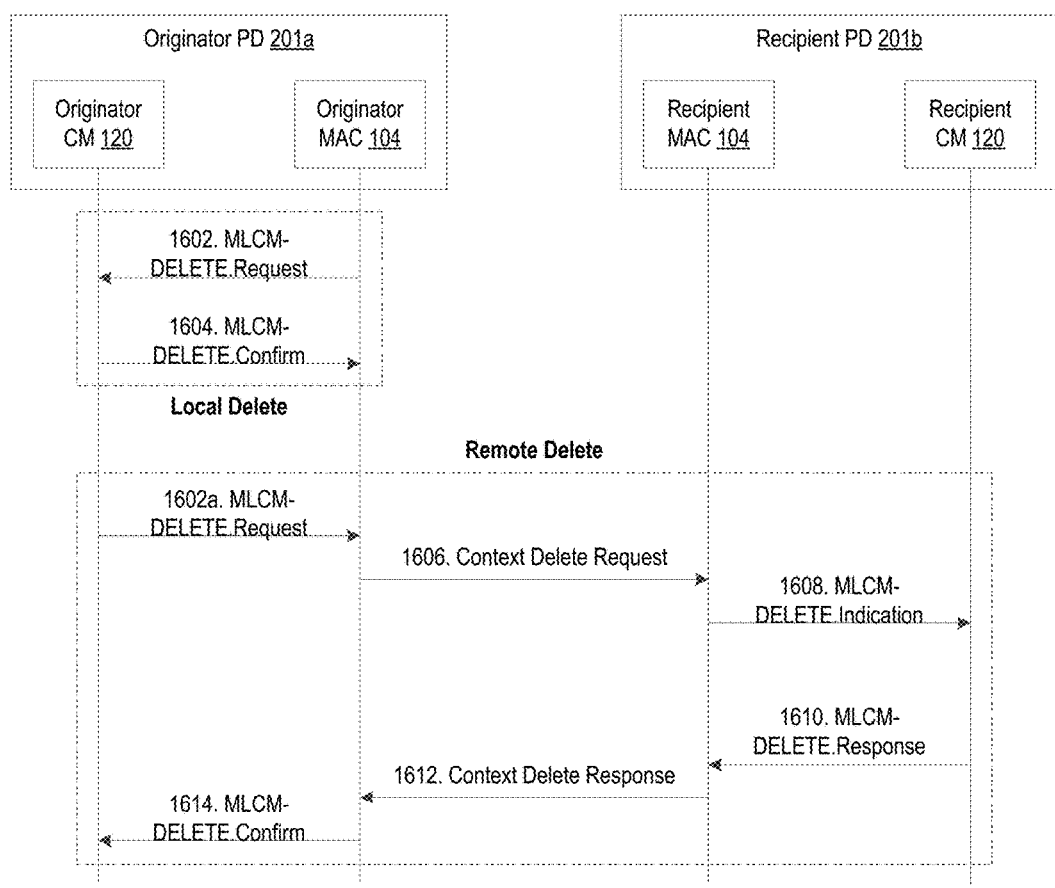
FIG. 16 is a call flow that shows an example procedure for deleting context information in accordance with an example embodiment.

Referring now to FIG. 16, another example of deleting context information is shown. At 1602, in accordance with the illustrated local delete example, the MAC layer 106 of the originator PD 201a sends an MLCM-DELETE.Request primitive to the context manager 120 of the PD 201a. At 1604, the context manager 120 of the PD 201a sends a MLCM-DELETE.Confirm primitive to the MAC layer 104 of the PD 201a. The MLCM-DELETE.Confirm primitive may contain a set of result elements associated with each context element indicated in the MLCM-DELETE.Request primitive. Each result element may contain one or more parameters such as, for example, the contextName and contextValue parameters. For example, the contextValue parameter identifies the value of the context information.

At 1602a, in accordance with the illustrated remote delete example, the context manager 120 of the PD 201a sends an MLCM-DELETE.Request primitive to the MAC layer 104 of the PD 201a. This primitive contains the contextName parameter and identifiers of remote peer devices associated with context information that the MAC layer 104 of the PD 201a wants to delete. The MLCM-DELETE.Request primitive may contain a set of context elements associated with the delete request. Each context element consists of one or more, for instance two, parameters, such as, for example, the contextName and the peerID. The contextName parameter may identify the context information associated with the delete request. The peerID parameter may identify remote peer devices (e.g., PD 201b) that should delete context information. This parameter may contain multiple identifiers, for example, if the MAC layer 104 of the PD 201a requests that context information is deleted from multiple devices. At 1606, the MAC layer 104 of the PD 201a sends a Context Delete Request message over the air to the MAC layer 104 of the recipient PD 201b. In response, at 1608, the MAC layer 104 of the PD 201b sends a MLCM-DELETE.Indication primitive to the context manager 120 of the PD 201b. The MLCM-DELETE.Indication primitive may contain a set of context elements received from the originator PD 201a. Each context element may consist of, for example, the contextName parameter and the peerID parameter. Here, the peerID parameter may identify the originator peerID 201a. At 1610, the MAC layer 104 of the PD 201b sends an MLCM-DELETE.Response primitive to the context manager 120 of the PD 201b. The MLCM-DELETE.Response primitive may contain an acknowledgement of the MLCM-DELETE.Indication primitive. At 1612, the MAC layer 104 of the recipient 201b sends a Context Delete Response message over the air to the MAC layer 104 of the PD 201a. This message may contain the contextName and a context deletion result (e.g., success or fail) associated with the remote delete request. At 1614, the MAC layer 104 of the PD 201a sends an MLCM-DELETE.Confirm primitive to context manager 120 of the PD 201a to indicate the context deletion result (e.g., success or fail). In an example, the MLCM-DELETE.Confirm primitive contains a set of result elements for each received context element as indicated in the MLCM-DELETE.Request primitive. Each result element may contain one or more parameters, such as, for example, the contextName primitive, the result primitive, and the peerID primitive. In accordance with the illustrated example, the result primitive may indicate whether the context information was successfully deleted. The peerID primitive identifies the remote peer device (e.g., peer 201b) that sends back the context delete response.

Figure 17:
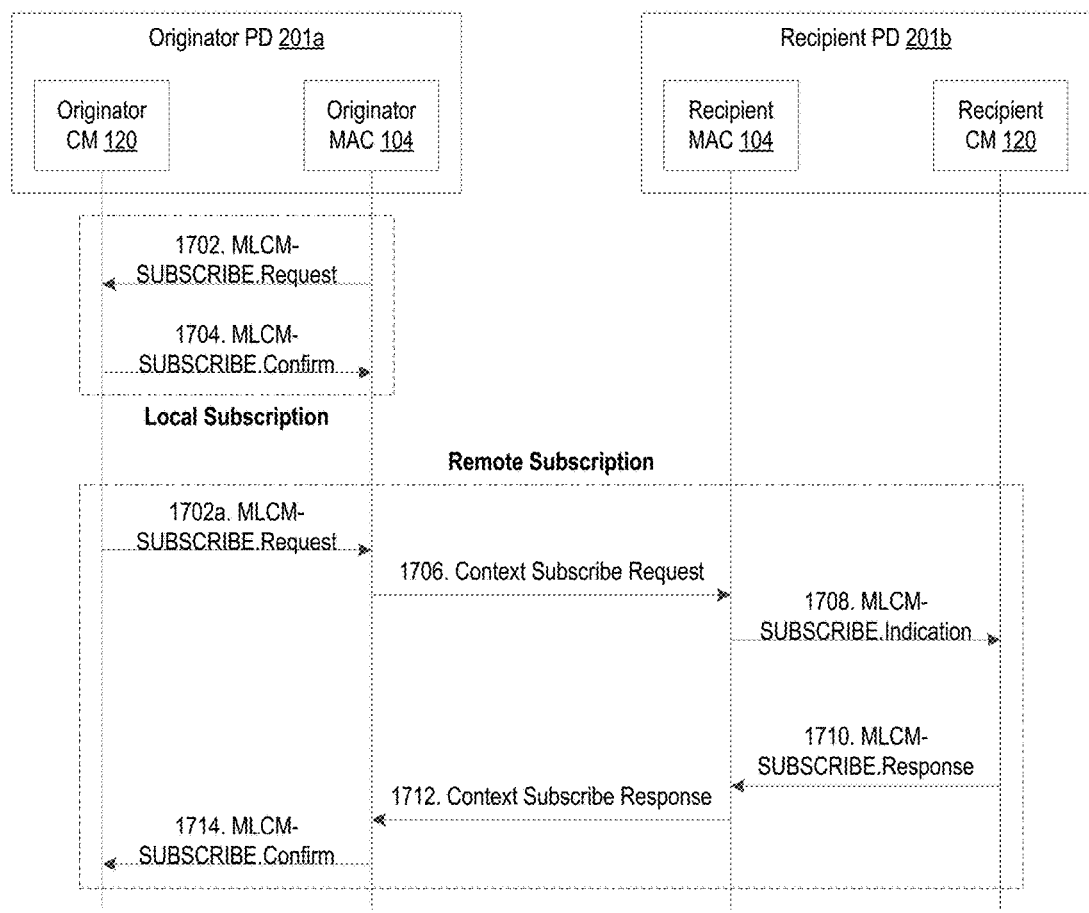
FIG. 17 is a call flow that shows an example procedure for subscribing to context information in accordance with an example embodiment.

Referring now to FIG. 17, examples of subscribing to context information are shown. At 1702 and 1704, an example local subscription is implemented. At 1202, as shown, the MAC layer 104 of the originator PD 201a sends an MLCM-SUBSCRIBE.Request primitive to the context manager 120 of the PD 201a. This primitive may contain a set of context elements to which the MAC layer 104 wants to subscribe. Each context element may include parameters, such as, for example, a contextName parameter, a subscriptionCriteria parameter, a timeDuration parameter, and a peerID parameter. At 1704, the context manager 120 of the originator PD 201a sends a MLCM-SUBSCRIBE.Confirm primitive to the MAC layer 104 of the originator PD 201a to indicate the context subscription result (e.g., success or fail).

At 1702a, in accordance with the illustrated remote subscription example, the originator CM 120 may send the MLCM-SUBSCRIBE.Request primitive to the MAC layer 104 of the PD 201a. The contextName parameter may identify the context information associated with the subscription. The subscriptionCriteria parameter may indicate a condition or criteria. If the condition or criteria is met, a notification may be provided to the subscribing device. A condition may be a predetermined frequency or a time interval without receiving a notification. Thus, for example, when the time interval elapses, a notification is sent to the originator PD 201a. The timeDuration parameter may indicate the lifetime of the requested subscription. The peerID parameter may identify one or more peer devices (e.g., recipient PD 201b) to which the PD 201a wants to subscribe. At 1706, in accordance with the illustrated example, the MAC layer 104 of the originator 201a sends a Context Subscribe Request message over the air to the MAC layer 201b of the recipient 201b. This message may contain various information, such as the information included in the request primitive at 1702a. At 1708, the MAC layer 104 of the recipient PD 201b sends an MLCM-SUBSCRIBE.Indication primitive to the context manager 120 of the recipient 201b. The MLCM-SUBSCRIBE.Indication primitive may contain a set of context elements received from the originator PD 201a. Each context may include, for example, the contextName parameter, which indicates context information associated with the subscription request, and the peerID parameter, which identifies the originator PD 201a of the subscription request. At 1710, the context manager 120 of the recipient PD 201b sends a MLCM-SUBSCRIBE.Response primitive to the MAC layer 104 of the recipient PD 201b. The MLCM-SUBSCRIBE.Response primitive may contain an acknowledgement of the MLCM-SUBSCRIBE.Indication primitive. At 1712, the MAC layer 104 of the recipient PD 201b sends a Context Subscribe Response message over the air to the MAC layer 104 of the originator 201a. This message may contain various information, such as, for example, the contextName and the context subscription result (e.g., success or fail). At 1714, in accordance with the illustrated embodiment, the MAC layer 104 of the originator PD 201a sends a MLCM-SUBSCRIBE.Confirm primitive to the context manager 120 of the originator PD 201a to indicate the context subscription result (e.g., success or fail). The MLCM-SUBSCRIBE.Confirm primitive may contain a set of result elements for each context element indicated in MLCM-SUBSCRIBE.Request primitive. Each result element may contain one or more parameters, for example the contextName parameter, the timeDuration parameter, and the peerID parameter. Here, the contextName parameter identifies the context information associated with the subscription. The timeDuration parameter may indicate a lifetime of the subscription. In one example, the lifetime may be assigned by the PD 201b. In some cases, a lifetime value of 'zero' indicates that the subscription request was rejected. The peerID parameter identifies the remote device associated with the subscription. In accordance with the illustrated example, the peerID parameter identifies the PD 201b that sent the response to the subscription request.

Figure 18:
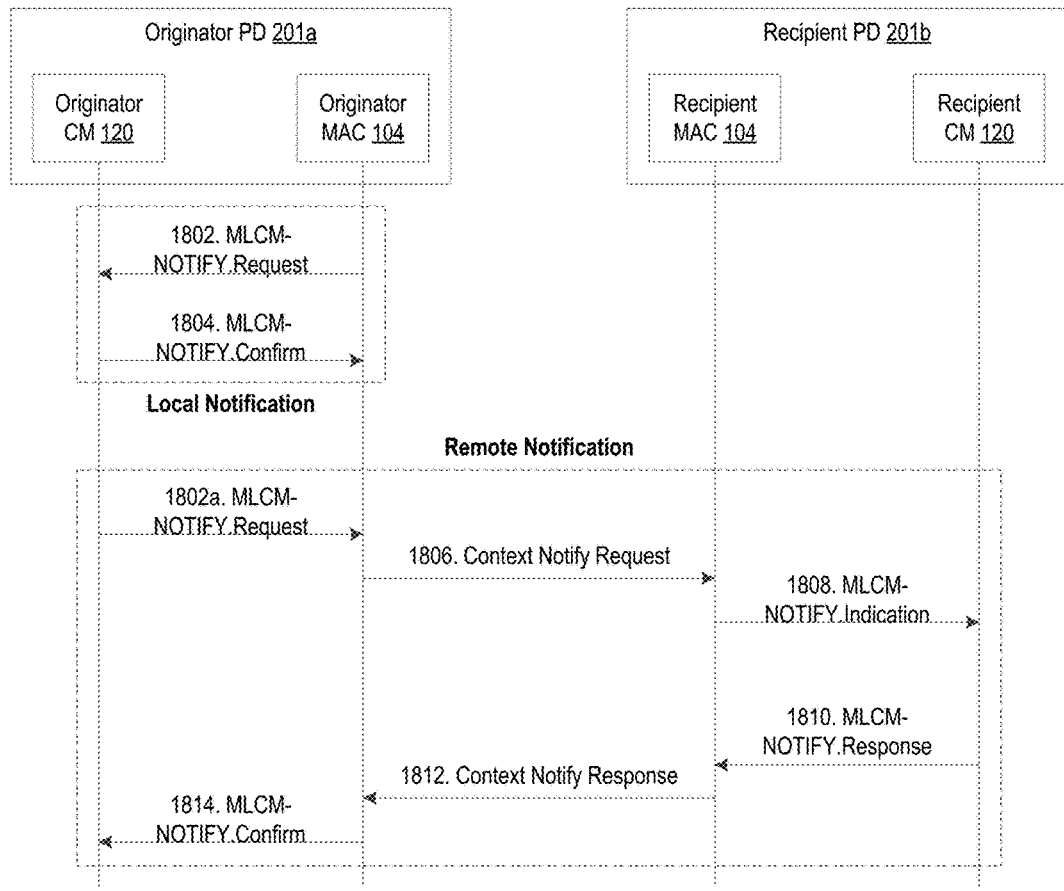
FIG. 18 is a call flow that shows an example procedure for notifying context information in accordance with an example embodiment.

Referring now to FIG. 18, examples for notifying a device of context information are shown. In accordance with one embodiment, steps 1802 and 1804 are used in local context notification and steps 1802a, 1806, 1808, 1810, 1812, and 1814 are used in remote context notification. At 1802, the originator MAC layer 104 sends an MLCM-NOTIFY.Request primitive to the context manager 120 of the originator PD 201a. The HLCM-NOTIFY.Request primitive may contain a set of context elements, each of which may include one or more parameters, such as, for example, the contextName and contextValue. Here, the contextName identifies the context information associated with the notification. The contextValue indicates the value of context information associated with the notification. At 1804, the context manager 120 of the originator PD 201a (originator context manager 120) sends a MLCM-NOTIFY.Confirm primitive to the MAC layer 104 of the originator PD 201a.

At 1802a, the context manager 120 of the originator PD 201a (originator context manager 120) sends an MLCM-NOTIFY.Request primitive to the MAC layer 104 of the originator PD 201a. The MLCM-NOTIFY.Request primitive may contain a set of context elements, each of which may include one or more parameters, such as, for example, the contextName, contextValue, and peerID. Here, the contextName identifies the context information associated with the notification. The contextValue indicates the value of context information associated with the notification. The peerID parameter may identify devices (e.g., PD 201b) associated with the notification. In an example, this parameter is not required for local context information notification. At 1806, in accordance with the remote notification example, the MAC layer 104 of the PD 201a (originator MAC layer 104) sends a Context Notify Request message over the air to the MAC layer 104 of the PD 201b (recipient MAC layer 104). This message may contain various information such as, for example, contextName, contextValue, etc. At 1808, the MAC layer 104 of the PD 201b sends a MLCM-NOTIFY.Indication primitive to the context manager 120 of the PD 201b. At 1810, the context manager 120 sends a MLCM-NOTIFY.Response primitive to the recipient MAC layer 104. At 1812, the recipient MAC layer 104 sends a Context Notify Response message over the air to the originator MAC layer 104 as an acknowledgement. At 1814, MAC layer 104 of the originator PD 201a (originator context manager 120) sends a MLCM-NOTIFY.Confirm primitive to the context manager 120 of the originator PD 201a. As described above, the MLCM-NOTIFY.Confirm primitive may contain the contextName parameter and the peerID parameter. The contextName parameter may identify the context information associated with the notification. Here, the peerID parameter may identify the recipient device associated with the remote notification.

Thus, as described above with general reference to FIGS. 4-18, a peer device, for instance a first peer device, can comprise a processor, a memory, and communication circuitry. The first peer device may be connected to a communications network via its communication circuitry, and the first peer device may further comprise computer-executable instructions stored in the memory of the first peer device which, when executed by the processor of the first peer device, cause the first peer device to, at a higher layer above a medium access control (MAC) layer in a protocol stack of the first peer device, initiate a request associated with context information. As described above, the request may include a subscription request, a report request, a notification request, or a delete request. The first peer device may send, via a context manger, a first primitive associated with the request to the MAC layer. In response to the first primitive, the first peer device may receive another primitive, for instance a second primitive, at the higher layer. The second primitive may indicate a result associated with the request. Furthermore, based on the request, the first peer device may send a context request to a MAC layer of a second peer device that is in peer-to-peer communications with the first peer device. For example, the context request may cause the MAC layer of the second peer device to send a third primitive to a higher layer of the second peer device, such that the higher layer of the second peer device produces the result indicated by the second primitive. Thus, as described above, the first and second primitives may be associated with at least one of a subscription request, a report request, a notification request, or a delete request.

As also described above with general reference to FIGS. 4-18, a system may include a recipient peer device that includes a physical (PHY) layer, a medium access control (MAC) layer above the PHY layer in a protocol stack, and a higher layer above the MAC layer in the protocol stack. At the MAC layer of the recipient peer device, a request from an originator peer device may be received. The request may be associated with context information. As described above, the recipient peer device may generate a primitive, for instance a first primitive, associated with the request and the context information. The recipient peer device may send the first primitive to the higher layer above the MAC layer. At the higher layer, the recipient device may generate a result associated with the request. For example, the recipient device may generate another primitive, for instance a second primitive, which is indicative of the result. The second primitive may be sent from the higher layer to the MAC layer. At the MAC layer, the recipient device may send a response to the originator peer device. The response may be indicative of the result. Primitives, for instance the first and second primitives, may be associated with at least one of a subscription request, a report request, a notification request, or a delete request.

Figure 2:
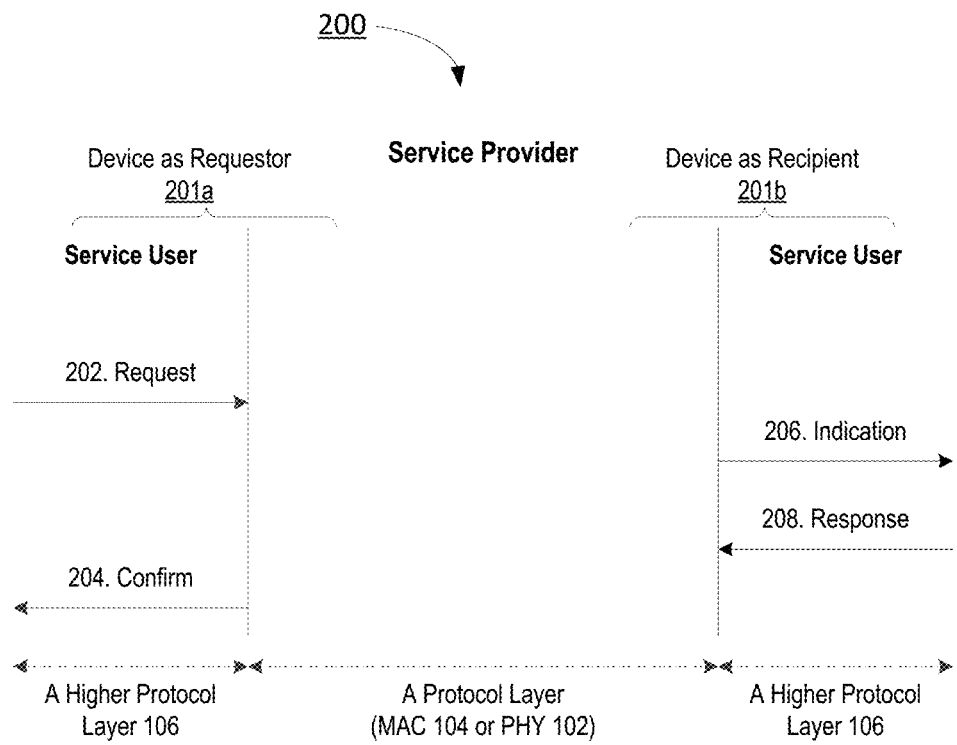
FIG. 2 shows an example service primitive mode from IEEE 802.15.4-2012.
Figure 3:
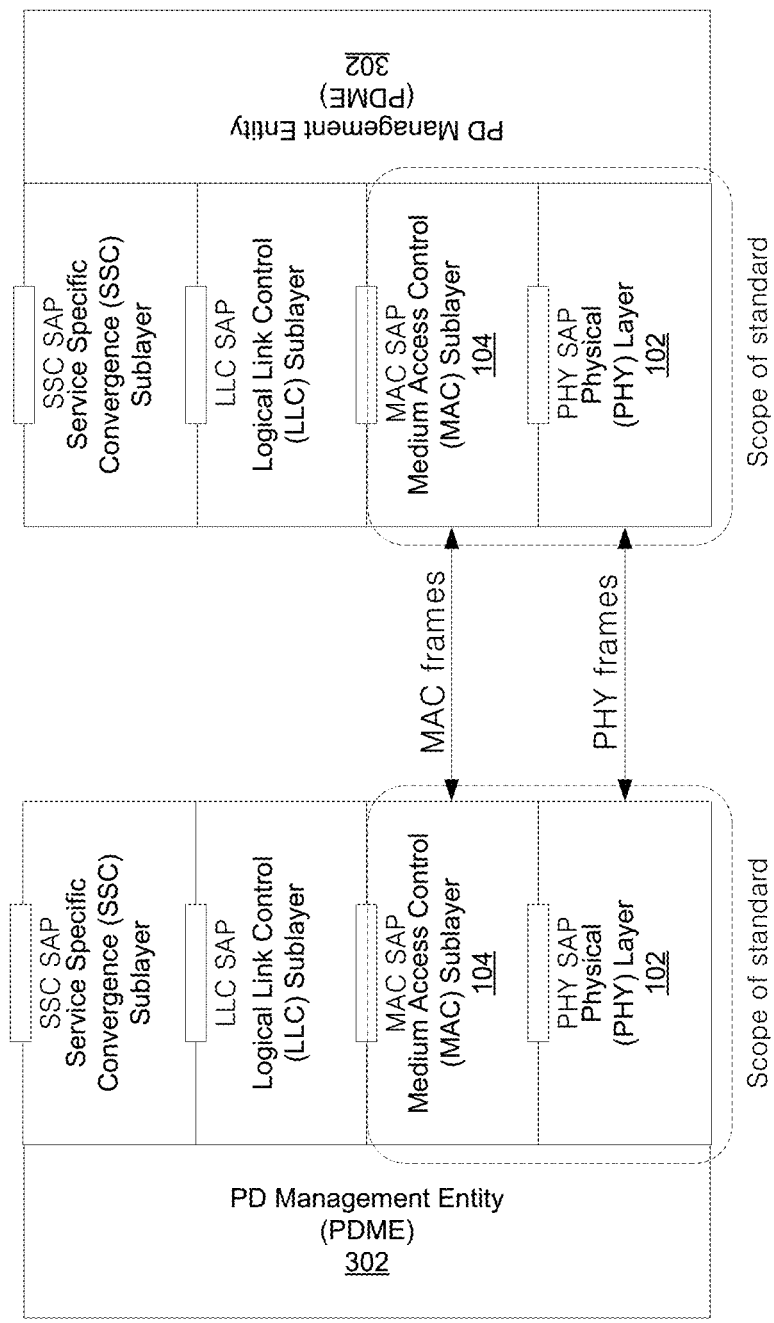
FIG. 3 shows an example reference model proposed for IEEE 802.15.8.
Figure 19:
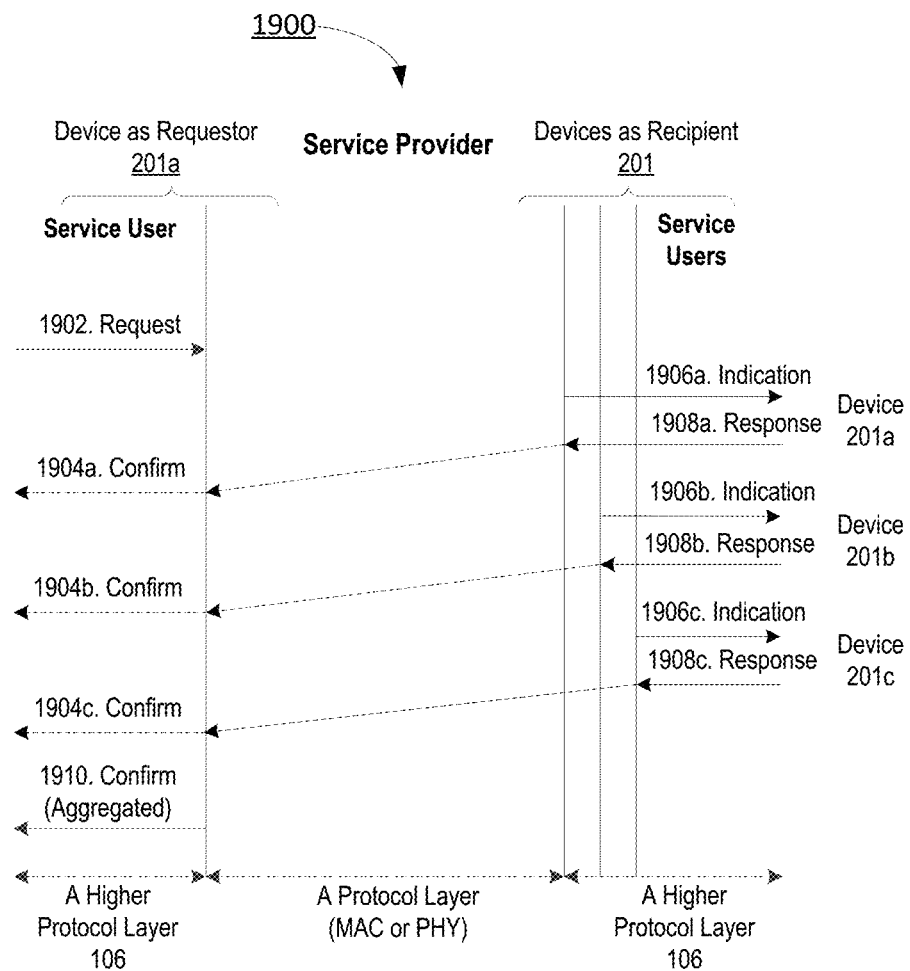
FIG. 19 shows a service primitive model in accordance with an example embodiment.
Figure 20:
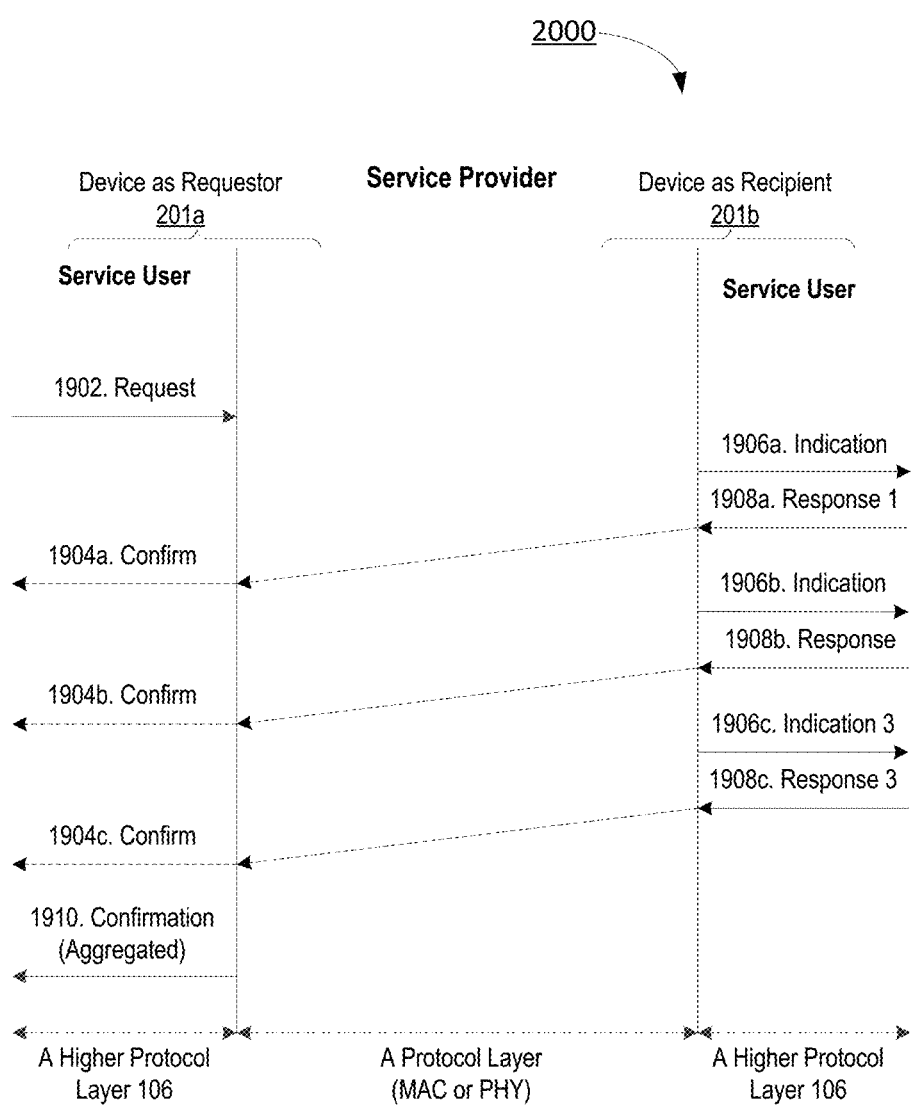
FIG. 20 shows another service primitive model in accordance with another example embodiment.

As shown in FIG. 2, in an existing service primitive model, one "Request" primitive results in one "Confirm" primitive at the same device (e.g., requester 201a) and potentially a pair of "Indication" and "Response" primitives at the other device (e.g., recipient 201b). Referring to FIGS. 19 and 20, service primitive models 1900 and 2000 are illustrated, respectively, in accordance with an example embodiment. As shown, one "Request" primitive 1902 may result in multiple "Confirm" primitives 1904 at the same device (requester 201a) and potentially multiple pairs of "Indication" and "Response" primitives at the other devices (one or multiple recipients). By using the illustrated models 1900 and 2000, the number of "Request" primitives 1902 that a service user (high layer 106 or MAC layer 104) needs to issue may be reduced as compared to existing models.

FIG. 19 illustrates an example model 1900 that includes one requestor 201a and multiple recipients 201, for instance first, second, and third recipients 201a, 201b, 201c, respectively. It will be understood that although three recipients 201 are illustrated, the model 1900 can be applied to any number of recipients as desired. As shown the "Request" primitive 1902 from the high layer 106 at the requestor 201a triggers the requestor 201a to send messages to multiple other devices, in particular a first recipient 201a, a second recipient 201b, and a third recipient 201c. Accordingly, there is potentially an "Indication" primitive 1906 and a "Response" 1908 primitive exchanged at each of the devices 201a-c. As shown, the requestor 201a can generate multiple "Confirm" primitives, for instance a first Confirm primitive 1904a, a second Confirm primitive 1904b, and a third Confirm primitive 1904c. Alternatively, the requestor 201a can generate an aggregated confirm primitive 1910. By way of example, the high protocol layer 106 may issue a single association "Request" primitive to the MAC layer 104 to trigger it to associate with multiple other devices. For each successful association, the MAC layer 104 may send a "Confirm" primitive back to the high layer 106, or the MAC layer 104 may send the aggregated association "Confirm" primitive 1910 back to the high layer 106 after completing association with each of the designated devices. By way of another example, the high protocol layer 106 may trigger the MAC layer 104 to trigger the device 201a to synchronize with multiple other devices, for instance, which are deployed at a home or in an office.

Thus, as described with reference to FIG. 19, a device, for instance a first peer device, may comprise a processor, a memory, and communication circuitry. The first peer device may be connected to a communications network via its communication circuitry. The first peer device may further comprise computer-executable instructions stored in the memory of the first peer device which, when executed by the processor of the first peer device, cause the first peer device to initiate request (at a higher layer above the MAC layer) that is associated with context information. The first peer device may send, via a context manger, a first primitive associated with the request to the MAC layer. In response to the first primitive, the first peer device may receive at least a second primitive at the higher layer. The second primitive may indicate a result associated with the request. Furthermore, as shown, based on the request, the first peer device may send a context request to a MAC layer of a plurality of peer devices, such that the plurality of peer devices can each respond to the context request. Thus, the first peer device may receive a plurality of responses associated with the request from the plurality of peer devices. The first peer device may aggregate the plurality of responses into an aggregated primitive.

FIG. 20 depicts the example model 2000 that includes one requestor device 201a and one recipient device 201b. Referring to FIG. 20, in accordance with the illustrated embodiment, the "Request" primitive 1902 triggers multiple "Indication" primitives 1906a-c and "Response" primitives 1908a-c at the recipient device 201b, which in turn may cause multiple "Confirm" primitives 1904a-c or the aggregated "Confirm" primitive 1910 at the requestor 201a. For example, a general context operation request primitive may generate multiple other primitives because the general context operation request primitive may contain multiple specific context operations and each specific context operation may lead to a separate set of other primitives (e.g., indication, response, and/or confirm). By way of another example, one context management message from the PD 201a to the PD 201b may cause multiple response messages back from the PD 201b, which in turn may mean multiple primitives.

Thus, as described above with reference to FIG. 20, a system may include a recipient peer device that includes a physical (PHY) layer, a medium access control (MAC) layer above the PHY layer in a protocol stack, and a higher layer above the MAC layer in the protocol stack. At the MAC layer of the recipient peer device, a request from an originator peer device may be received. The request may be associated with context information. As described above, the recipient peer device may generate a plurality of primitives, for instance which include a first primitive, in response to the request. The primitives may be associated with respective context information. The recipient peer device may send the primitives to the higher layer above the MAC layer. At the higher layer, the recipient device may generate a result associated with the request. Further, the recipient peer device may send responses associated with each of the plurality of primitives to the originator peer device.

The disclosed primitives described above can be implemented in various context management scenarios, some of which are presented below by way of example and without limitation. In one example, referring to FIG. 21, a first PD 201a measures its context information at its PHY layer 102, and reports the information to a second PD 201b, which in turn notifies its high layer 106. In another example, referring to FIG. 22 and FIG. 19, the first PD 201a decides to send a context notification to the second PD 201b and the third PD 201c.

Figure 21:
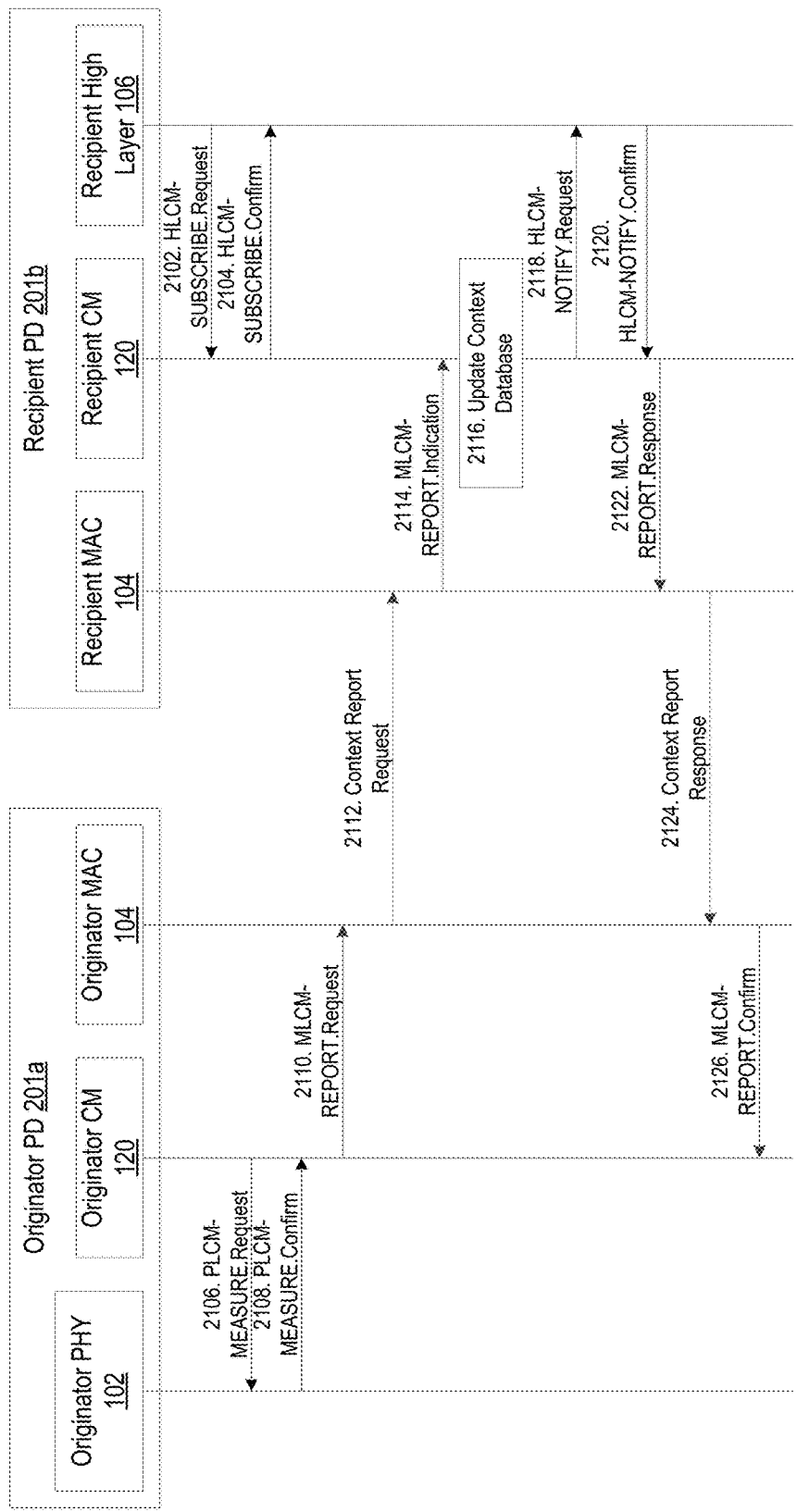
FIG. 21 shows an example integrated context management procedure using context report for one example scenario, in accordance with another example embodiment.

Referring particularly to FIG. 21, at 2102, the recipient high layer 106 sends the HLCM-SSUBSCRIBE.Request primitive to the recipient context manager 120 to subscribe to a particular context (e.g., link quality at the originator PD 201a). At 2104, in accordance with the illustrated example, the recipient context manager 120 sends the HLCM-SUBSCRIBE. Confirm primitive to the recipient high layer 106. At 2106, the originator context manager 120 sends the PLCM-MEASURE.Request primitive, to the originator PHY layer 102, to measure a particular context (e.g., link quality). At 2108, the originator PHY 102 sends the PLCM-MEASURE.Confirm primitive to the originator context manager 120. At 2110, in accordance with the illustrated example, the originator context manager 120 decides to report such measured context to the recipient 201b by sending the MLCM-REPORT.Request primitive to the originator MAC layer 104. At 2112, the originator MAC layer 104 sends the Context Report Request message over the air to the recipient MAC layer 104. At 2114, the recipient MAC layer 104 sends the MLCM-REPORT.Indication primitive to the recipient context manager 120. At 2116, the recipient context manager 120 updates its context database accordingly. At 2118, the recipient context manager 120 decides to send the HLCM-NOTIFY.Request primitive to the recipient high layer 106, for example, because the recipient high layer 106 creates the context subscription with the recipient context manager 120. At 2120, the recipient high layer 106 sends the HLCM-NOTIFY.Confirm primitive to the recipient context manager 120. At 2122, the recipient context manager 120 sends the MLCM-REPORT.Response primitive to the recipient MAC layer 104. At 2124, the recipient MAC layer 104 sends the Context Report Response over the air to the originator MAC layer 104. At 2126, the originator MAC layer 104 sends the MLCM-REPORT.Confirm primitive to the originator context manager 120.

Figure 22:
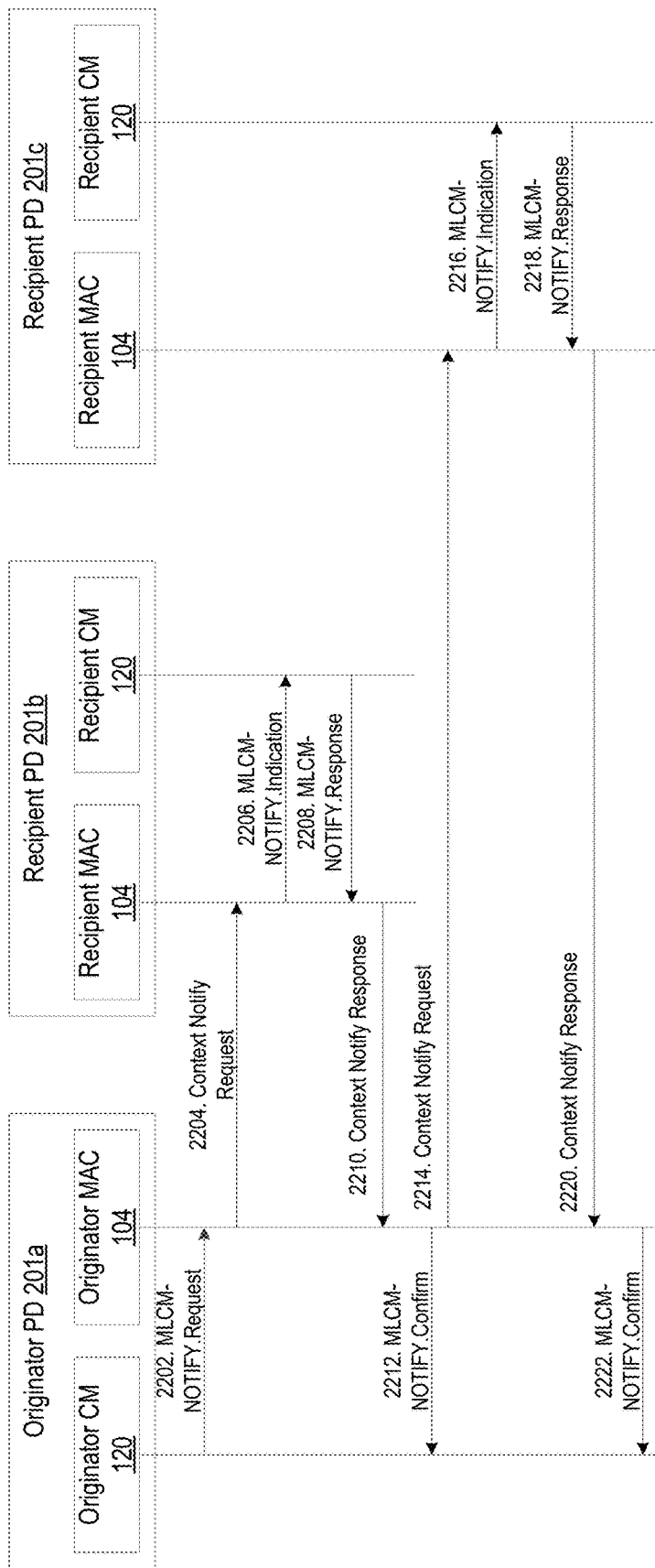
FIG. 22 shows an example integrated context management procedure using context report for another example scenario, in accordance with yet another example embodiment.

Referring now to FIG. 22, at 2202, the originator context manager 120 sends the MLCM.NOTIFY.Request primitive to the originator MAC layer 104 to request that context information be changed. By way of example, a location of the PD 201a may have changed, and the request maybe sent so that context information associated with the location is updated and provided to other peer devices accordingly. This primitive may trigger steps 2204 and 2214, and one or more of the illustrated primitives. At 2204, in accordance with the illustrated example, the originator 201a sends the Context Notify Request message to the recipient MAC layer 104 of the second PD 201b. At 2206, the recipient MAC layer 104 of the second PD 201b sends the MLCM-NOTIFY.Indication primitive to its context manager 120. At 2208, the recipient context manager 120 of the second PD 201b sends the MLCM-NOTIFY.Response primitive to its MAC layer 104. At 2210, the recipient MAC layer 104 of the second PD 201b sends the Context Notify Response message to the originator MAC layer 104 of the first PD 201a. At 2212, the originator MAC layer 104 sends the MLCM-NOTIFY.Confirm primitive to the originator context manager 120. At 2214, the originator 201a sends the Context Notify Request message to the recipient MAC layer 104 of the third PD 201c. At 2216, the recipient MAC layer 104 of the third PD 201c sends the MLCM-NOTIFY.Indication primitive to its context manager 120. At 2218, the recipient context manager 120 of third PD 201c sends the MLCM-NOTIFY.Response primitive to its MAC layer 104. At 2210, the recipient MAC layer 104 of the third PD 201c sends the Context Notify Response message to the originator MAC layer of the first PD 201a. At 2211, the originator MAC layer 201a sends the MLCM-NOTIFY.Confirm primitive to the originator context manager 120.

Still referring to FIG. 22, in one embodiment, step 2214 can be performed immediately after Step 2204. Further, in an example embodiment, step 2212 can be skipped and combined with step 2222. In this case, the originator MAC layer 104 may send one, for instance only one, MLCM-NOTIFY.Confirm primitive to the originator CM 120, which contains response information from both the second PD 201b and the third PD 201c.

In accordance with another example embodiment, the HLCM SAP 122 described above is leveraged as a user interface for users or applications on a PD. The user interface can be used to preconfigure, access, and/or manage the described context management functions on the PD.

Figure 23A:
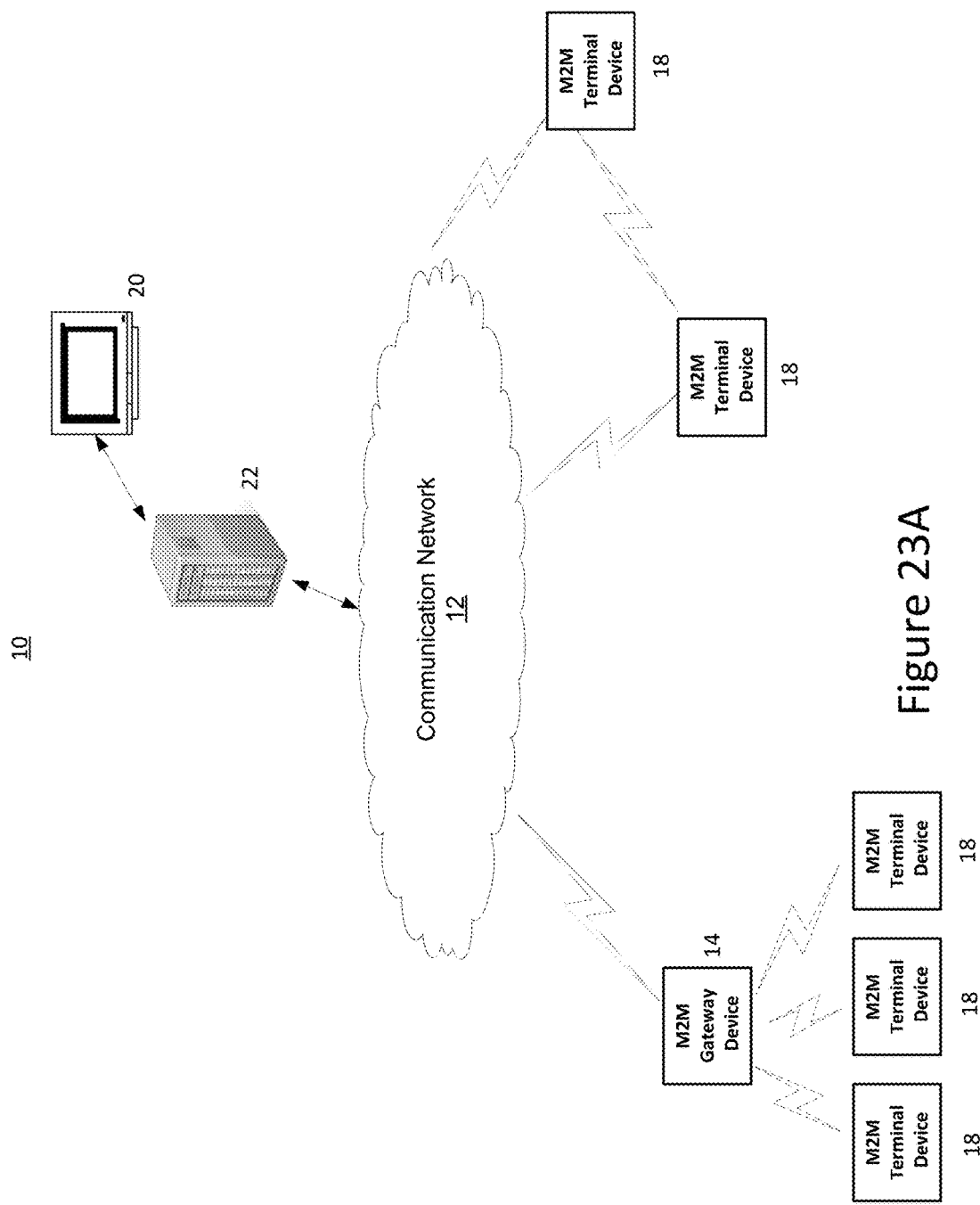
FIG. 23A is a system diagram of an example machine-to-machine (M2M) or Internet of Things (IoT) communication system in which one or more disclosed embodiments may be implemented.

FIG. 23A is a diagram of an example machine-to machine (M2M) or Internet of Things (IoT) communication system 10 in which context management as described herein may be implemented. Generally, M2M technologies provide building blocks for the IoT, and any M2M device, gateway or service platform may be a component of the IoT as well as an IoT service layer, etc. Any of the peer devices illustrated in FIGS. 4-22 may comprise a node of a communication system such as the one illustrated in FIGS. 23A-D.

As shown in FIG. 23A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 23B:
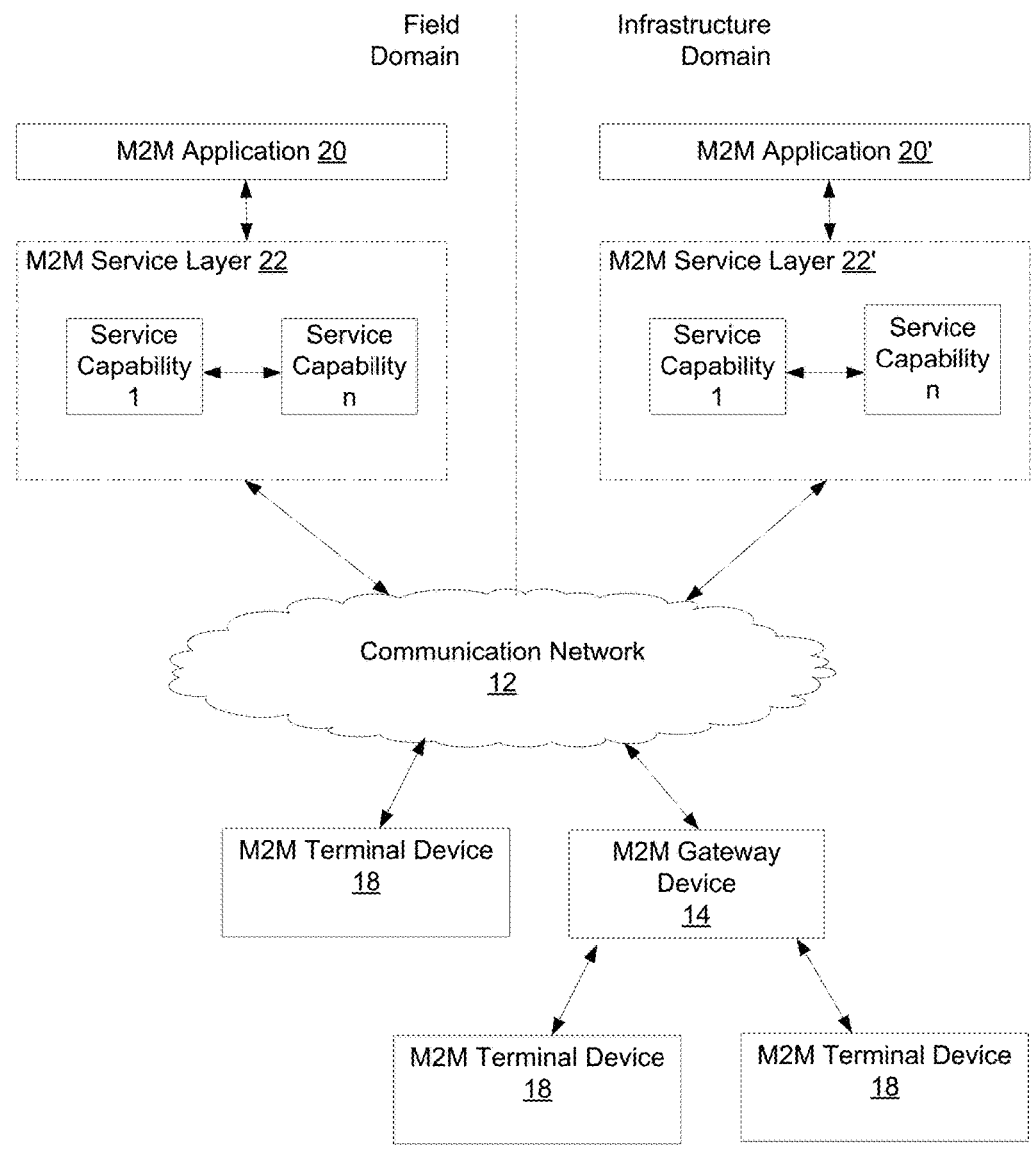
FIG. 23B is a system diagram of an example architecture that may be used within the M2M/IoT communications system illustrated in FIG. 23A.

Referring to FIG. 23B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 23B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 23A and 23B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 23C or 23D described below.

Further, the methods and functionalities described herein may be implemented as part of an M2M network that uses a Service Oriented Architecture (SOA) and/or a resource-oriented architecture (ROA) to access services, such as the above-described context management for example.

Figure 23C:
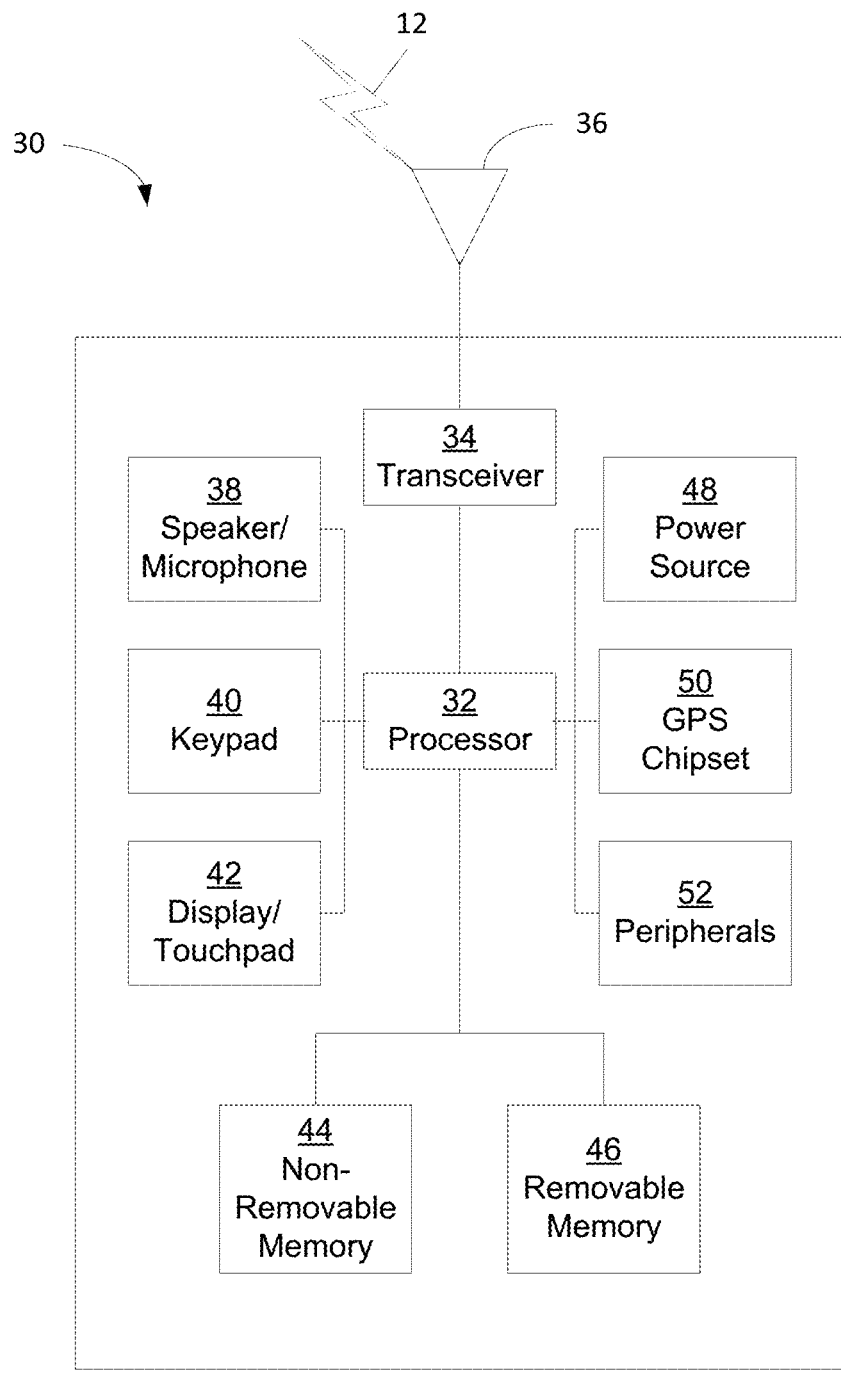
FIG. 23C is a system diagram of an example M2M/IoT terminal or gateway device that may be used within the communications system illustrated in FIG. 23A.

FIG. 23C is a block diagram of an example hardware/software architecture of a node of a network, such as one of the peer devices illustrated in FIGS. 4-22, which may operate as an M2M server, gateway, device, or other node in an M2M network such as that illustrated in FIGS. 23A and 23B. As shown in FIG. 23C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the context management functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 23C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 23C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 4-22) and in the claims. While FIG. 23C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a peer device, or other underlying networks, applications, or other services in communication with the peer device. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 23D:
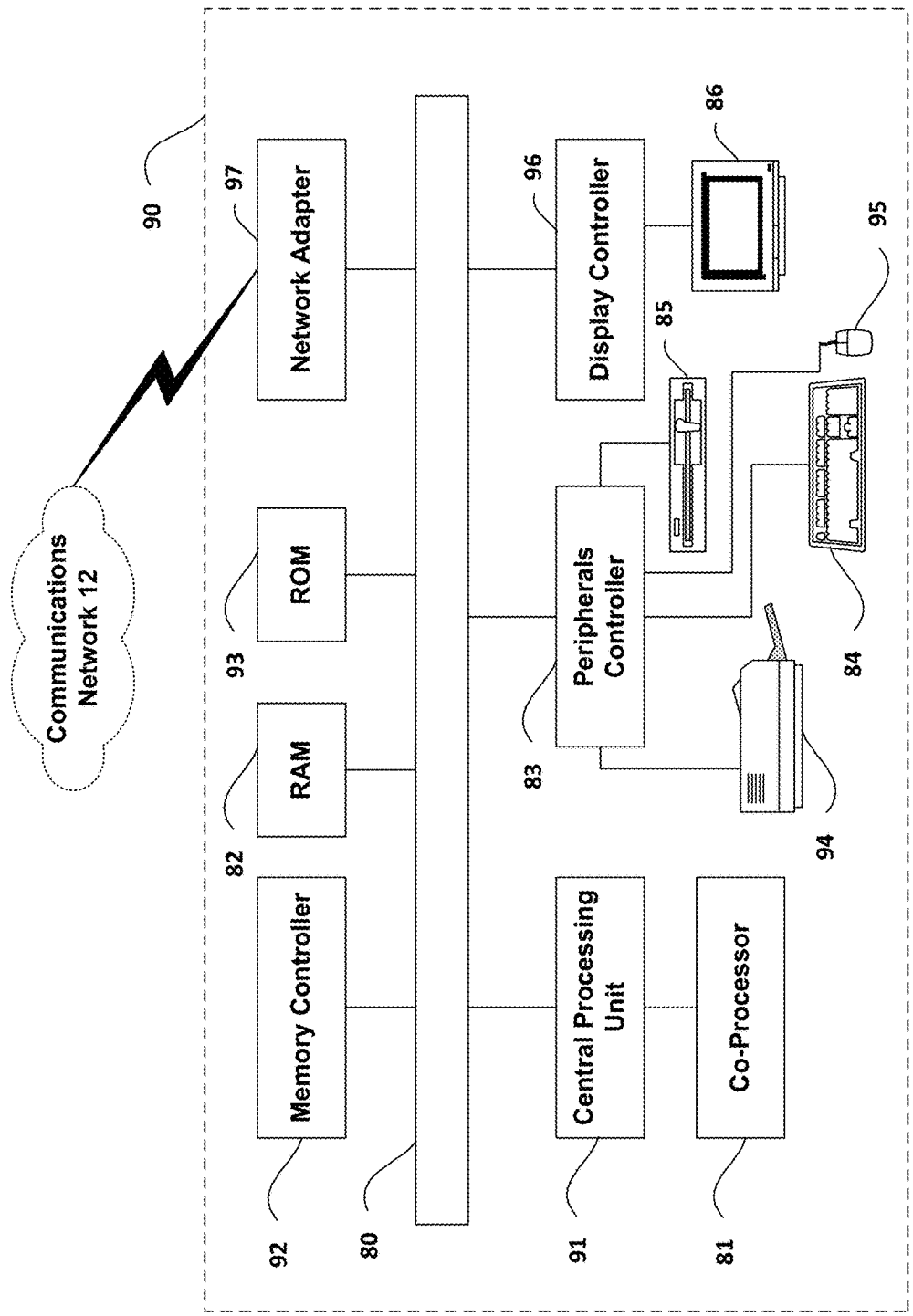
FIG. 23D is a block diagram of an example computing system in which aspects of the communication system of FIG. 23A may be embodied.

FIG. 23D is a block diagram of an exemplary computing system 90 which may also be used to implement one or more nodes of a network, such as the nodes illustrated in FIGS. 4-22, which may operates as an M2M server, gateway, device, or other node in an M2M network such as that illustrated in FIGS. 23A and 23B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 23A and FIG. 23B, to enable the computing system 90 to communicate with other nodes of the network. The communication circuitry, alone or in combination with the CPU 91, may be used to perform the transmitting and receiving steps described herein (e.g., in FIGS. 4-22) and in the claims.

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, peer device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. At a first peer device comprising a processor, a memory, and communication circuitry, the first peer device being connected to a communications network via its communication circuitry, the first peer device further comprising computer-executable instructions stored in the memory of the first peer device which, when executed by the processor of the first peer device, cause the first peer device to:

at a higher layer above a medium access control (MAC) layer in a protocol stack of the first peer device, initiate a request associated with context information;

send, via a context manger, a first primitive associated with the request to the MAC layer; and in response to the first primitive, receive a second primitive at the higher layer, the second primitive indicating a result that includes the context information associated with the request.

2. The first peer device of claim 1, wherein the computer-executable instructions further cause the first peer device to:
based on the request, send a context request to a MAC layer of a second peer device in peer-to-peer communications with the first peer device.

3. The first peer device of claim 2, wherein the context request causes the MAC layer of the second peer device to send a third primitive to a higher layer of the second peer device, such that the higher layer of the second peer device produces the result indicated by the second primitive.

4. The first peer device as recited in claim 1, wherein the first and second primitives are associated with at least one of a subscription request, a report request, a notification request, or a delete request.

5. The first peer device as recited in claim 1, wherein the computer-executable instructions further cause the first peer device to:
based on the request, send a context request to a MAC layer of a plurality of peer devices, such that the plurality of peer devices can each respond to the context request.

6. The first peer device as recited in claim 5, wherein the computer-executable instructions further cause the first peer device to:
receive a plurality of responses associated with the request from the plurality of peer devices; and
aggregate the plurality of responses into an aggregated primitive.

7. In a system comprising a first peer device that includes a physical (PHY) layer, a medium access control (MAC) layer above the PHY layer in a protocol stack, and a higher layer above the MAC layer in the protocol stack, a method comprising:
at the higher layer, initiating a request associated with context information;
sending, via a context manger, a first primitive associated with the request to the MAC layer; and
in response to the primitive, receiving a second primitive at the higher layer, the second primitive indicating a result associated with the request.

8. The method as recited in claim 7, the method further comprising:
based on the request, sending a context request to a MAC layer of a second peer device in peer-to-peer communications with the first peer device.

9. The method as recited in claim 8, wherein the context request causes the MAC layer of the second peer device to send a third primitive to a higher layer of the second peer device, such that the second peer device produces the result indicated by the second primitive.

10. The method as recited in claim 7, wherein the first and second primitives are associated with at least one of a subscription request, a report request, a notification request, or a delete request.

11. At a recipient peer device comprising a processor, a memory, and communication circuitry, the recipient peer device being connected to a communications network via its communication circuitry, the recipient peer device further comprising computer-executable instructions stored in the memory of the recipient peer device which, when executed by the processor of the recipient peer device, cause the recipient peer device to:
at a medium access control (MAC) layer of the recipient peer device, receive a request from an originator peer device, the request associated with context information;
generate a first primitive associated with the request and the context information;
send the first primitive to a layer above the MAC layer; and
at the layer above the MAC layer, generate a result that includes the context information associated with the request.

12. The recipient peer device of claim 11, wherein the computer-executable instructions further cause the recipient peer device to:
generate a second primitive indicative of the result; and
send the second primitive from the layer above the MAC layer to the MAC layer.

13. The recipient peer device of claim 12, wherein the computer-executable instructions further cause the recipient peer device to:
at the MAC layer, send a response to the originator peer device, the response indicative of the result.

14. The originator peer device as recited in claim 12, wherein the first and second primitives are associated with at least one of a subscription request, a report request, a notification request, or a delete request.

15. In a system comprising a recipient peer device that includes a physical (PHY) layer, a medium access control (MAC) layer above the PHY layer in a protocol stack, and a higher layer above the MAC layer in the protocol stack, a method comprising:
at the MAC layer of the recipient peer device, receiving a request from an originator peer device, the request associated with context information;
generating a first primitive associated with the request and the context information;
sending the first primitive to the higher layer above the MAC layer; and
at the higher layer above the MAC layer, generating a result that includes the context information associated with the request.

16. The method as recited in claim 15, the method further comprising:
generating a second primitive indicative of the result; and
sending the second primitive from the higher layer to the MAC layer.

17. The method as recited in claim 16, the method further comprising:
at the MAC layer, sending a response to the originator peer device, the response indicative of the result.

18. The method as recited in claim 16, wherein the first and second primitives are associated with at least one of a subscription request, a report request, a notification request, or a delete request.

19. The method as recited in claim 15,
in response to the request, generating a plurality of primitives, each of the plurality of primitives associated with respective context information; and
sending responses associated with each of the plurality of primitives to the originator peer device.

* * * * *